(12) United States Patent
Amaya et al.

(10) Patent No.: US 10,442,136 B2
(45) Date of Patent: Oct. 15, 2019

(54) THREE-DIMENSIONAL LAMINATING AND FABRICATING SYSTEM, THREE-DIMENSIONAL LAMINATING AND FABRICATING METHOD, LAMINATING AND FABRICATING CONTROL APPARATUS AND METHOD OF CONTROLLING THE SAME, AND CONTROL PROGRAM

(71) Applicant: TECHNOLOGY RESEARCH ASSOCIATION FOR FUTURE ADDITIVE MANUFACTURING, Tokyo (JP)

(72) Inventors: Koichi Amaya, Fukui (JP); Tetsushi Midorikawa, Fukui (JP); Masaaki Kawaji, Fukui (JP)

(73) Assignee: TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 523 days.

(21) Appl. No.: 15/124,801

(22) PCT Filed: May 31, 2016

(86) PCT No.: PCT/JP2016/066058
§ 371 (c)(1),
(2) Date: Sep. 9, 2016

(87) PCT Pub. No.: WO2017/208361
PCT Pub. Date: Dec. 7, 2017

(65) Prior Publication Data
US 2018/0215101 A1    Aug. 2, 2018

(51) Int. Cl.
*B29C 64/393* (2017.01)
*B33Y 30/00* (2015.01)
(Continued)

(52) U.S. Cl.
CPC .......... *B29C 64/393* (2017.08); *B29C 64/153* (2017.08); *B29C 64/264* (2017.08);
(Continued)

(58) Field of Classification Search
CPC ... B29C 64/393; B29C 64/264; B29C 64/153; B29C 64/277; B33Y 10/00; B33Y 30/00;
(Continued)

(56) References Cited

U.S. PATENT DOCUMENTS 7,635,825 B2    12/2009  Larsson
9,138,807 B1     9/2015  Takezawa et al.
(Continued)

FOREIGN PATENT DOCUMENTS

EP    1 583 625 B1     8/2009
EP    2 926 925 A2    10/2015
(Continued)

OTHER PUBLICATIONS

Ding D, Pan Z, Cuiuri D, Li H. A practical path planning methodology for wire and arc additive manufacturing of thin-walled structures. Robotics and Computer-Integrated Manufacturing. Aug. 1, 2015;34:8-19. (Year: 2015).*
(Continued)

*Primary Examiner* — Brian W Wathen
*Assistant Examiner* — Alicia M. Choi
(74) *Attorney, Agent, or Firm* — Ladas & Parry LLP

(57) ABSTRACT

This invention provides a three-dimensional laminating and fabricating system that shortens the scanning time of a divided scanning region and shortens the fabricating time of three-dimensional laminating and fabricating. The three-dimensional laminating and fabricating system includes a laminating and fabricating unit that includes at least one irradiator configured to irradiate a laminating material and fabricates each layer of a laminated and fabricated object
(Continued)

made of the laminating material as an aggregate of cell regions, and a laminating and fabricating controller that controls the laminating and fabricating unit such that the irradiator irradiates the laminating material in each of the cell regions by performing spiral scanning along sides of a scanning region that is used to irradiate the cell regions by the irradiator and has a shape including at least five vertices with an interior angle of not less than 90°.

11 Claims, 20 Drawing Sheets

(51) Int. Cl.
*B33Y 50/00* (2015.01)
*B33Y 50/02* (2015.01)
*B29C 64/277* (2017.01)
*B29C 64/264* (2017.01)
*B33Y 10/00* (2015.01)
*B29C 64/153* (2017.01)
*B22F 3/105* (2006.01)

(52) U.S. Cl.
CPC ............ *B29C 64/277* (2017.08); *B33Y 10/00* (2014.12); *B33Y 30/00* (2014.12); *B33Y 50/00* (2014.12); *B33Y 50/02* (2014.12); *B22F 2003/1056* (2013.01); *Y02P 10/295* (2015.11)

(58) Field of Classification Search
CPC ....... B33Y 50/00; B33Y 50/02; Y02P 10/295; G02B 1/118; B22F 2003/1056; B22F 3/1055
USPC ............................................................ 700/98
See application file for complete search history.

(56) References Cited

U.S. PATENT DOCUMENTS

| 2002/0015654 | A1* | 2/2002 | Das ...................... B22F 3/1055 419/8 |
| 2006/0157454 | A1 | 7/2006 | Larsson |
| 2010/0014766 | A1* | 1/2010 | Akenine-Moller ....... G06T 9/00 382/239 |
| 2015/0283612 | A1 | 10/2015 | Maeda et al. |
| 2015/0283762 | A1 | 10/2015 | Maeda et al. |
| 2016/0067820 | A1 | 3/2016 | Mironets et al. |
| 2017/0165751 | A1* | 6/2017 | Buller .................. B29C 64/307 |
| 2017/0176977 | A1* | 6/2017 | Huang ............... G05B 19/4099 |
| 2018/0022029 | A1* | 1/2018 | Morovic ................. G06T 19/00 700/98 |
| 2018/0024672 | A1* | 1/2018 | Thiele ................... G06F 3/0488 345/173 |
| 2018/0326669 | A1* | 11/2018 | Chen ...................... B29C 67/00 |

FOREIGN PATENT DOCUMENTS

| JP | 5-38763 A | 2/1993 |
| JP | 6-71761 A | 3/1994 |
| JP | 6-297586 A | 10/1994 |
| JP | 7-100941 A | 4/1995 |
| JP | 3342125 B2 | 8/2002 |
| JP | 2009-6509 A | 1/2009 |
| JP | 4639087 B2 | 12/2010 |
| JP | 2015-199195 A | 11/2015 |
| JP | 2015-199197 A | 11/2015 |
| WO | 2004/056509 A1 | 7/2004 |
| WO | 2014/176536 A1 | 10/2014 |

OTHER PUBLICATIONS

Extended European Search Report (ESR) dated May 11, 2018 mailed in connection with corresponding European Patent Application No. EP 16 82 3147.0.
J-PlatPat English abstract of JP 3342125 B2.
Japanese Office Action dated Jul. 20, 2017 mailed in connection with corresponding Japanese Application No. 2016-547101, with English translation.
J-PlatPat English abstract of JP 2009-6509 A.
J-PlatPat English abstract of JP 5-38763 A.
J-PlatPat English abstract of JP 7-100941 A.
International Search Report (ISR) dated Aug. 30, 2016 for International Application No. PCT/JP2016/066058.
Written Opinion (WO) dated Aug. 30, 2016 for International Application No. PCT/JP2016/066058.
J-PlatPat English abstract of JP 6-297586 A.
J-PlatPat English abstract of JP 6-71761 A.
J-PlatPat English abstract of JP 2015-199195 A.
J-PlatPat English abstract of JP 2015-199197 A.

* cited by examiner

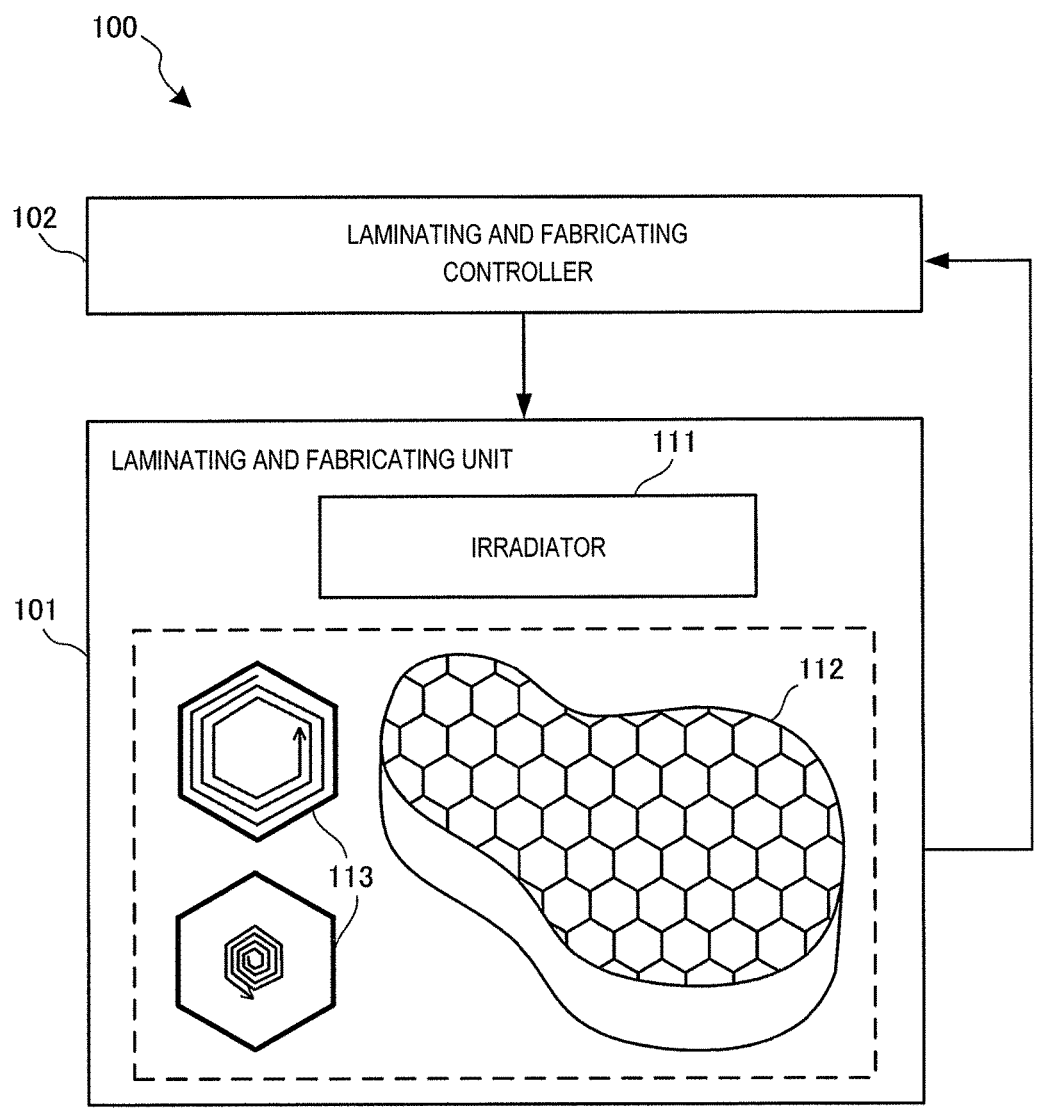
F I G. 1

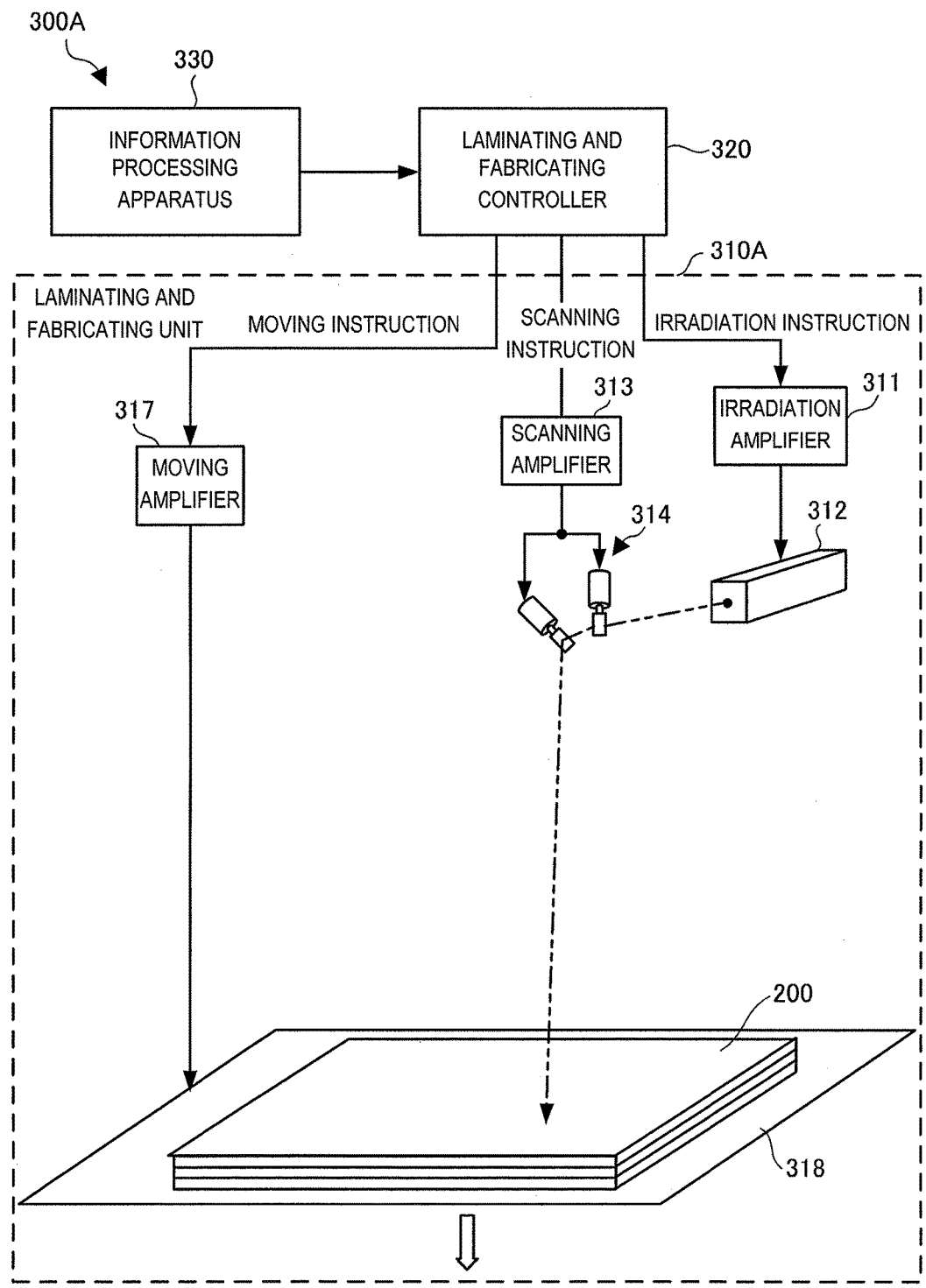
F I G. 3A

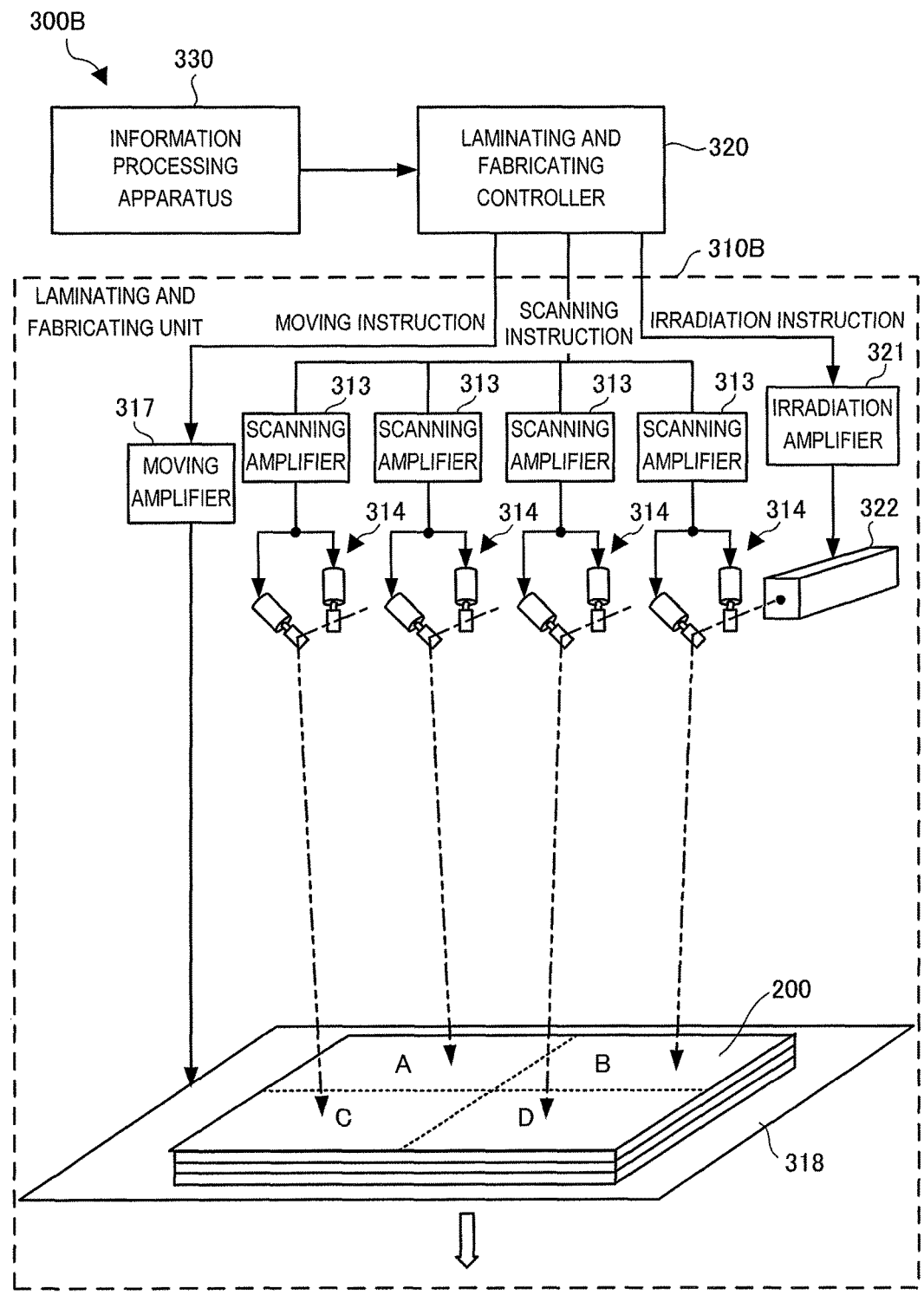
F I G. 3B

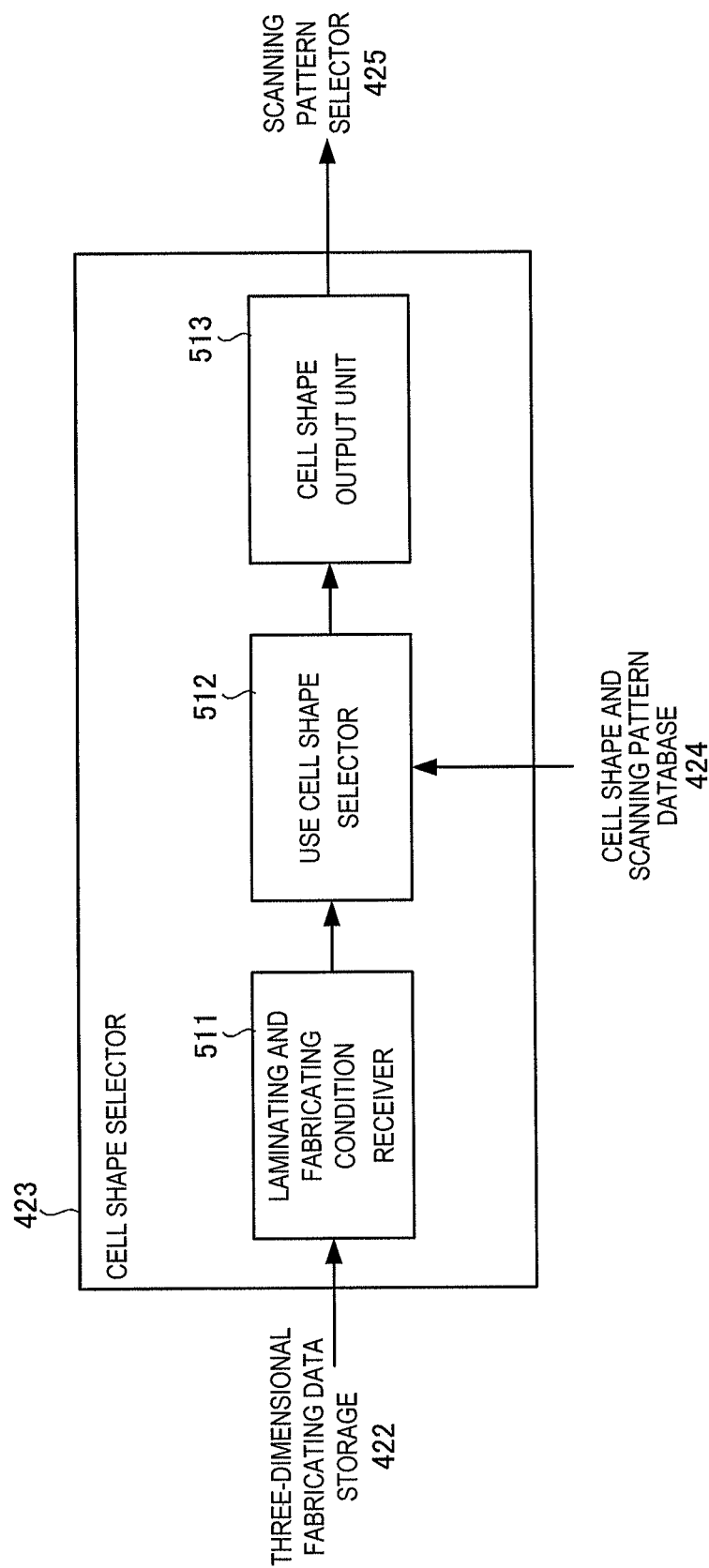
F I G. 5A

| LAMINATING AND FABRICATING CONDITION 611 | | CELL SHAPE 612 | | CELL SIZE 613 | SCANNING PATTERN 614 | | SCANNING PITCH 615 |
|---|---|---|---|---|---|---|---|
| MATERIAL CONDITION | FABRICATING CONDITION ... | FIRST SHAPE | SECOND SHAPE ... | | FROM PERIPHERY | FROM CENTER | |
| | | PENTAGON | | | | | |
| | | HEXAGON | | | | | |
| | | OCTAGON | | | | | |
| | | CIRCLE | RECTANGLE | | | | |
| ... | | | | | | | |

620 →

| CELL SHAPE 621 | CELL SIZE 622 | SCANNING PATTERN 623 | SCANNING PITCH 624 | SCANNING SPEED CONTROL PARAMETER 625 | IRRADIATION INTENSITY CONTROL PARAMETER 626 |
|---|---|---|---|---|---|
| PENTAGON | | | | | |
| HEXAGON | | | | | |
| OCTAGON | | | | | |
| CIRCLE | | | | | |
| ... | | | | | |

424

| 801 | 802 | | | 803 | | 804 | 805 |
|---|---|---|---|---|---|---|---|
| IRRADIATOR ID | THREE-DIMENSIONAL FABRICATING DATA | | | CELL INFORMATION | | SCANNING SPEED CONTROL PARAMETER | IRRADIATION INTENSITY CONTROL PARAMETER |
| | CELL POSITION | FABRICATING/ NON-FABRICATING FLAG | ... | CELL SHAPE (SIZE) | SCANNING PATTERN (PITCH) | | |
| | | | | | | | |
| | | | | | | | |
| ... | ... | | | | | | |

| LAMINATING AND FABRICATING CONDITION 611 | | SCANNING SHAPE 1312 | | SCANNING REGION SIZE 1313 | SCANNING PATTERN 614 | | SCANNING PITCH 615 |
|---|---|---|---|---|---|---|---|
| MATERIAL CONDITION | FABRICATING CONDITION ... | FIRST SHAPE | SECOND SHAPE | | FROM PERIPHERY | FROM CENTER | |
| | | PENTAGON | | | | | |
| | | HEXAGON | | | | | |
| | | OCTAGON | RECTANGLE | | | | |
| | | CIRCLE | | | | | |

1320

| SCANNING SHAPE 1321 | SCANNING REGION SIZE 1322 | SCANNING PATTERN 623 | SCANNING PITCH 624 | CELL SHAPE 621 | CELL SIZE 622 | SCANNING SPEED CONTROL PARAMETER 625 | IRRADIATION INTENSITY CONTROL PARAMETER 626 | IRRADIATION ON/OFF CONTROL PARAMETER 1327 |
|---|---|---|---|---|---|---|---|---|
| PENTAGON | | | | | | | | |
| HEXAGON | | | | | | | | |
| OCTAGON | | | | | | | | |
| CIRCLE | | | | | | | | |
| ... | | | | | | | | | ental laminating and fabricating, and has a shape

THREE-DIMENSIONAL LAMINATING AND FABRICATING SYSTEM, THREE-DIMENSIONAL LAMINATING AND FABRICATING METHOD, LAMINATING AND FABRICATING CONTROL APPARATUS AND METHOD OF CONTROLLING THE SAME, AND CONTROL PROGRAM

RELATED APPLICATION

This application is an application under 35 U.S.C. 371 of International Application No. PCT/JP2016/066058 filed on May 31, 2016, the entire contents of which are incorporated herein by reference.

TECHNICAL FIELD

The present invention relates to a technique of controlling the scanning pattern of a cell region in three-dimensional laminating and fabricating.

BACKGROUND ART

In the above technical field, patent literature 1 discloses a technique of dividing a laminated and fabricated object into rectangular regions and irradiating the rectangular regions according to different scanning patterns (see FIG. 4 of patent literature 1).

CITATION LIST

Patent Literature

Patent literature 1: Japanese Patent No. 4639087

SUMMARY OF THE INVENTION

Technical Problem

In the technique described in the above literature, however, the scanning pattern of each rectangular region includes a scanning direction change of 90° or 180°. Since the scanning speed needs to be reduced before and after the change, the scanning time of each divided region becomes long, and eventually, the fabricating time of three-dimensional laminating and fabricating becomes long.

The present invention enables to provide a technique of solving the above-described problem.

Solution to Problem

One aspect of the present invention provides a three-dimensional laminating and fabricating system comprising:

a laminating and fabricating unit that includes at least one irradiator configured to irradiate a laminating material and fabricates, as an aggregate of cell regions, each layer of a laminated and fabricated object made of the laminating material; and a laminating and fabricating controller that controls said laminating and fabricating unit such that said irradiator irradiates the laminating material in each of the cell regions by performing spiral scanning along sides of a scanning region that is used to irradiate the cell regions by said irradiator and has a shape including at least five vertices with an interior angle of not less than 90°.

Another aspect of the present invention provides a method of three-dimensional laminating and fabricating, comprising:

fabricating, as an aggregate of cell regions, each layer of a laminated and fabricated object made of a laminating material, using a laminating and fabricating unit including at least one irradiator configured to irradiate the laminating material; and controlling the laminating and fabricating unit such that the irradiator irradiates the laminating material in each of the cell regions by performing spiral scanning along sides of a scanning region that is used to irradiate the cell regions by the irradiator and has a shape including at least five vertices with an interior angle of not less than 90°.

Still other aspect of the present invention provides a laminating and fabricating control apparatus comprising:

a data acquirer that acquires data of a laminated and fabricated object as a target of laminating and fabricating; and a scanning controller that controls a laminating and fabricating unit including at least one irradiator configured to irradiate a laminating material and fabricating each layer of the laminated and fabricated object as an aggregate of cell regions, said scanning controller controlling the laminating and fabricating unit based on the data of the laminated and fabricated object such that said irradiator irradiates the laminating material in each of the cell regions by performing spiral scanning along sides of a scanning region that is used to irradiate the cell regions by the irradiator and has a shape including at least five vertices with an interior angle of not less than 90°.

Still other aspect of the present invention provides a method of controlling a laminating and fabricating control apparatus, comprising:

acquiring data of a laminated and fabricated object as a target of laminating and fabricating; and controlling a laminating and fabricating unit that includes at least one irradiator configured to irradiate a laminating material and fabricates each layer of the laminated and fabricated object as an aggregate of cell regions, based on the data of the laminated and fabricated object, such that the irradiator irradiates the laminating material in each of the cell regions by performing spiral scanning along sides of a scanning region that is used to irradiate the cell regions by the irradiator and has a shape including at least five vertices with an interior angle of not less than 90°.

Still other aspect of the present invention provides a control program of a laminating and fabricating control apparatus, which causes a computer to execute a method, comprising:

acquiring data of a laminated and fabricated object as a target of laminating and fabricating; and controlling a laminating and fabricating unit that includes at least one irradiator configured to irradiate a laminating material and fabricates each layer of the laminated and fabricated object as an aggregate of cell regions, based on the data of the laminated and fabricated object, such that the irradiator irradiates the laminating material in each of the cell regions by performing spiral scanning along sides of a scanning region that is used to irradiate the cell regions by the irradiator and has a shape including at least five vertices with an interior angle of not less than 90°.

Advantageous Effects of Invention

According to the present invention, it is possible to shorten the scanning time of a divided scanning region and shorten the fabricating time of three-dimensional laminating and fabricating.

BRIEF DESCRIPTION OF THE DRAWINGS

FIG. 1 is a block diagram showing the arrangement of a three-dimensional laminating and fabricating system according to the first embodiment of the present invention;

FIG. 3A is a block diagram showing a functional arrangement of a laminating and fabricating unit in the three-dimensional laminating and fabricating system according to the second embodiment of the present invention;

FIG. 3B is a block diagram showing another functional arrangement of the laminating and fabricating unit in the three-dimensional laminating and fabricating system according to the second embodiment of the present invention;

FIG. 5A is a block diagram showing the functional arrangement of a cell shape selector according to the second embodiment of the present invention;

FIG. 6 is a view showing the arrangement of a cell shape and scanning pattern database according to the second embodiment of the present invention;

FIG. 8 is a view showing the arrangement of a laminating and fabricating instruction table according to the second embodiment of the present invention;

FIG. 13 is a view showing the arrangement of a scanning shape and scanning pattern database according to the third embodiment of the present invention;

DESCRIPTION OF THE EMBODIMENTS

Figure 2A:
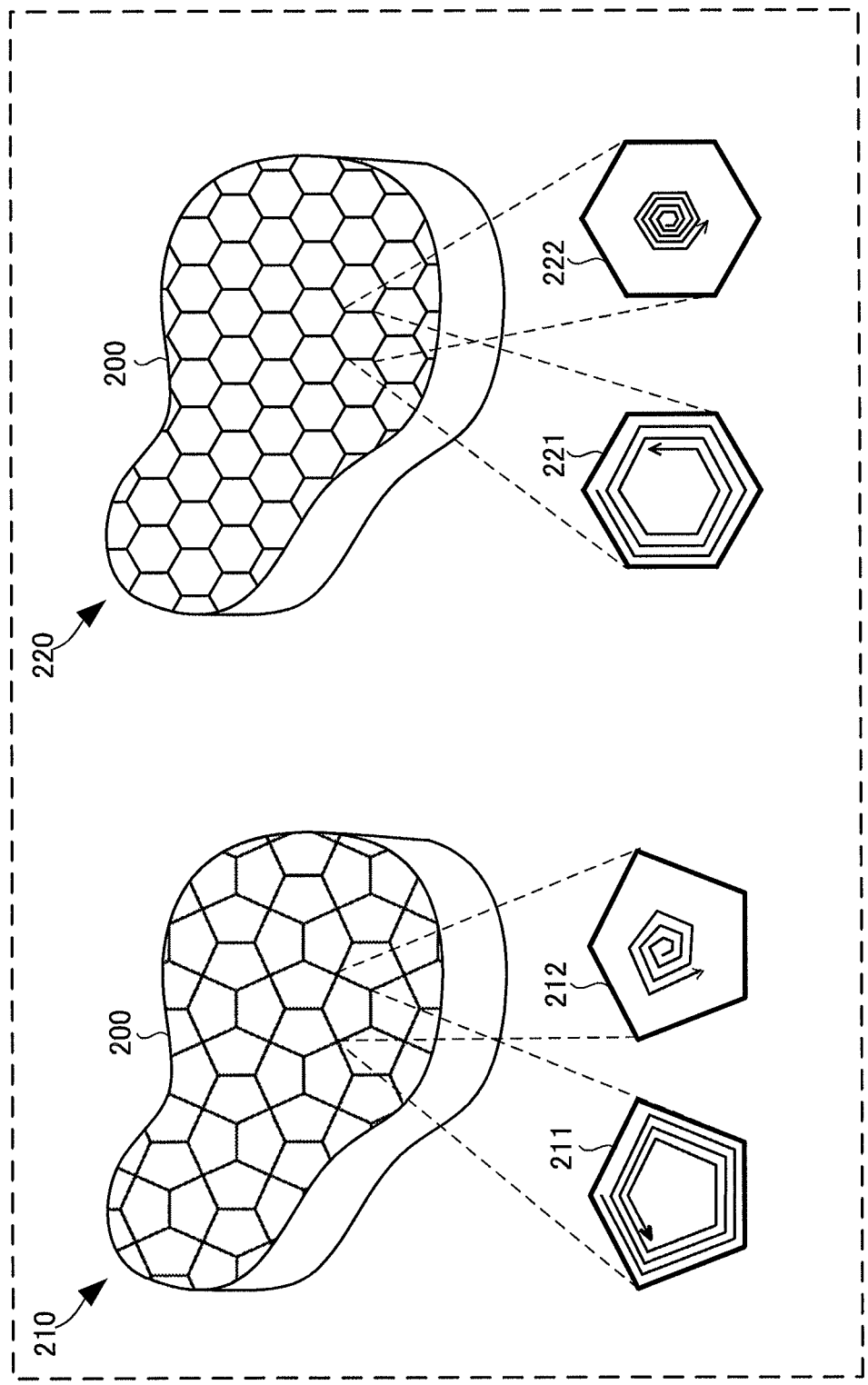
FIG. 2A is a conceptual view showing a fabricating state by a three-dimensional laminating and fabricating system according to the second embodiment of the present invention.

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise. A term "cell region" used in this specification indicates a region obtained by dividing the fabricating region of each layer into tiny regions in three-dimensional laminating and fabricating. A three-dimensional laminating and fabricating system according to each embodiment irradiates the cell regions according to various scanning patterns, thereby implementing fabricating of each layer as an aggregate of cell regions.

(First Embodiment)

A three-dimensional laminating and fabricating system 100 according to the first embodiment of the present invention will be described with reference to FIG. 1. The three-dimensional laminating and fabricating system 100 is a system that performs three-dimensional laminating and fabricating by irradiating a laminating material.

As shown in FIG. 1, the three-dimensional laminating and fabricating system 100 includes a laminating and fabricating unit 101 and a laminating and fabricating controller 102. The laminating and fabricating unit 101 includes at least one irradiator 111 that irradiates a laminating material, and fabricates each layer of a laminated and fabricated object 112 made of the laminating material as an aggregate of cell regions. The laminating and fabricating controller 102 controls the laminating and fabricating unit 101 such that the irradiator 111 irradiates the laminating material in each cell region by performing spiral scanning along the sides of a scanning region 113 that has a shape including at least five vertices with an interior angle of 90° or more and is used to irradiate the cell region by the irradiator.

According to this embodiment, the scanning region of the irradiator has a shape including at least five vertices with an interior angle of 90° or more. The laminating material in each cell region is irradiated by performing spiral scanning along the sides of the scanning region, thereby shortening the scanning time of the divided scanning region and shortening the fabricating time of three-dimensional laminating and fabricating.

(Second Embodiment)

Laminating and fabricating by a three-dimensional laminating and fabricating system according to the second embodiment of the present invention will be described next. In the three-dimensional laminating and fabricating system according to this embodiment, when fabricating a laminated and fabricated object as an aggregate of cell regions, each cell region has a pentagonal shape, a hexagonal shape, an octagonal shape, . . . , or a circular shape, or a combination of the shapes is used. An irradiator irradiates each cell region spirally from the periphery or the center, thereby fabricating a three-dimensional laminated and fabricated object.

Note that in this embodiment, the shape of the scanning region matches the shape of the cell region. The shape of the scanning region includes the shape of the cell region. Control is performed to perform irradiation if the position of the spiral scanning is located within the cell region and prohibit irradiation if the position of the spiral scanning is located outside the cell region. The shape of the scanning region includes a circle. As the shape of the scanning region, a combination of shapes including different numbers of vertices is selected. A plurality of irradiators are provided to shape a plurality of cell regions in parallel. The shapes of the scanning region and the cell region and the start point of spiral scanning are selected based on laminating and fabricating conditions including a material condition and a fabricating condition used for laminating and fabricating. The irradiation energy of the irradiator is controlled in accordance with the scanning speed and the scanning position.

<<Concept of Fabricating of Three-Dimensional Laminating and Fabricating System>>

Figure 2B:
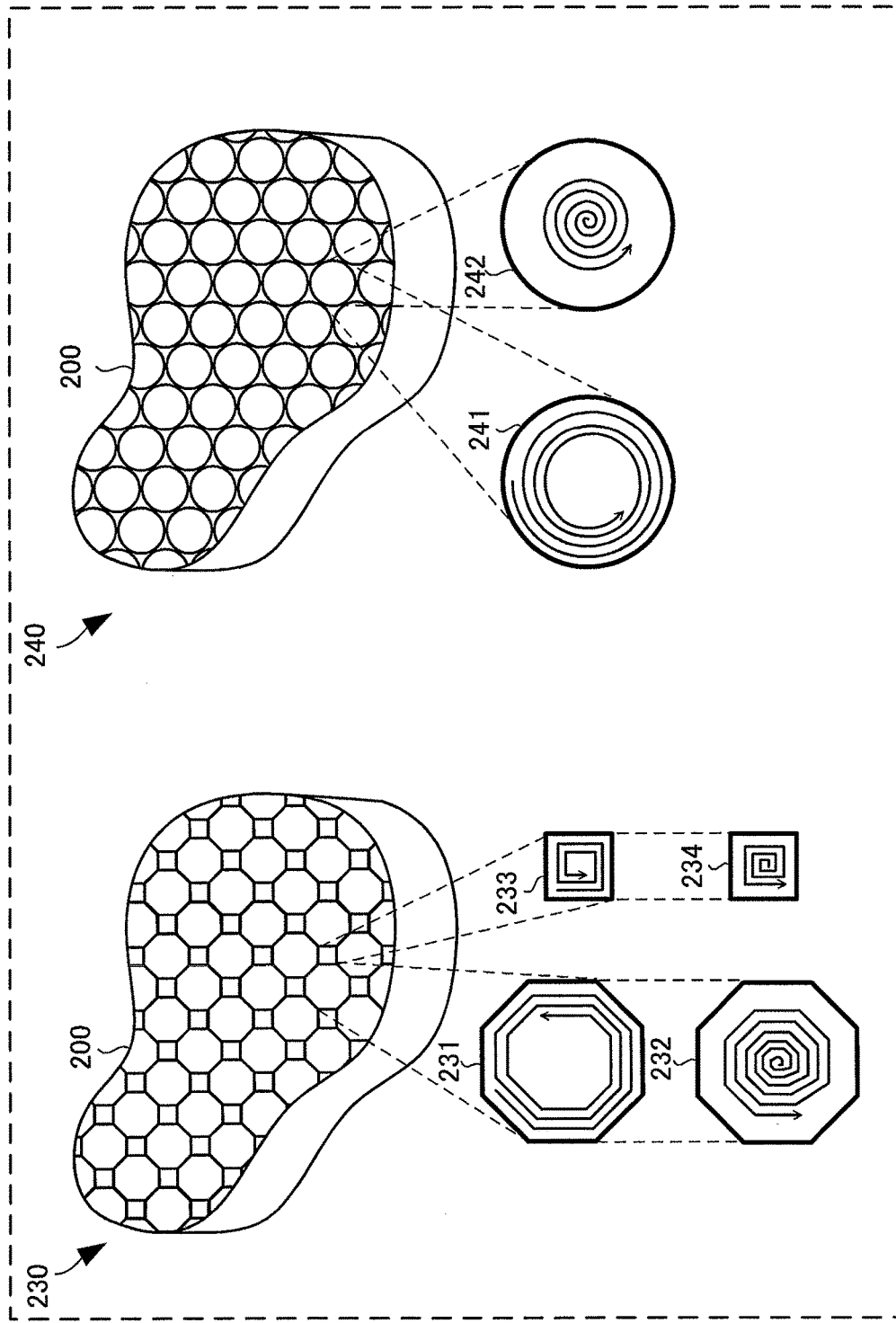
FIG. 2B is a conceptual view showing a fabricating state by the three-dimensional laminating and fabricating system according to the second embodiment of the present invention.

FIGS. 2A and 2B are conceptual views each showing a fabricating state by the three-dimensional laminating and fabricating system according to this embodiment. Note that in FIGS. 2A and 2B, a fabricating portion 200 on one laminated surface will be described as an example.

The left view of FIG. 2A shows a case in which an aggregate of cell regions of the same pentagonal shape is set, and laminating and fabricating are performed by irradiation from the irradiator. A cell region 211 shows a pattern used to perform irradiation while performing spiral scanning from the periphery to the center of the pentagon. A cell region 211 shows a pattern used to perform irradiation while performing spiral scanning from the center to the periphery of the pentagon. Note that the irradiation may be done using the same pattern of the cell region 211 or 212 of the fabricating portion 200. Alternatively, the irradiation may be done using a combination of the cell regions 211 and 212 in consideration of the molten state of the material.

The right view of FIG. 2A shows a case in which an aggregate of cell regions of the same hexagonal shape is set, and laminating and fabricating are performed by irradiation from the irradiator. A cell region 221 shows a pattern used to perform irradiation while performing spiral scanning from the periphery to the center of the hexagon. A cell region 222 shows a pattern used to perform irradiation while performing spiral scanning from the center to the periphery of the hexagon. Note that the irradiation may be done using the same pattern of the cell region 221 or 222 of the fabricating portion 200. Alternatively, the irradiation may be done using a combination of the cell regions 221 and 222 in consideration of the molten state of the material.

The left view of FIG. 2B shows a case in which octagonal and rectangular cell regions are combined, and laminating and fabricating are performed by irradiation from the irradiator. A cell region 231 shows a pattern used to perform irradiation while performing spiral scanning from the periphery to the center of the octagon. A cell region 232 shows a pattern used to perform irradiation while performing spiral scanning from the center to the periphery of the octagon. A cell region 233 shows a pattern that fills a gap between the octagonal cell regions and is used to perform irradiation while performing spiral scanning from the periphery to the center of the rectangle. A cell region 234 shows a pattern that fills a gap between the octagonal cell regions and is used to perform irradiation while performing spiral scanning from the center to the periphery of the rectangle. Note that the irradiation may be done using the same combination of the patterns of the cell regions 231 to 233 of the fabricating portion 200. Alternatively, the irradiation may be done using a different combination of the cell regions 231 to 234 in consideration of the molten state of the material.

The right view of FIG. 2B shows a case in which an aggregate of cell regions of the same circular shape is set, and laminating and fabricating are performed by irradiation from the irradiator. A cell region 241 shows a pattern used to perform irradiation while performing spiral scanning from the periphery to the center of the circle. A cell region 242 shows a pattern used to perform irradiation while performing spiral scanning from the center to the periphery of the circle. Note that the irradiation may be done using the same pattern of the cell region 241 or 242 of the fabricating portion 200. Alternatively, the irradiation may be done using a combination of the cell regions 241 and 242 in consideration of the molten state of the material.

Note that cases in which the cell regions have pentagonal, hexagonal, octagonal, and circular shapes have been described with reference to FIGS. 2A and 2B. However, the shapes are not limited to these. According to this embodiment, a shape including at least five vertices each with an interior angle of 90° or more can be used.

<<Functional Arrangement of Laminating and Fabricating Unit>>

FIG. 3A is a block diagram showing a functional arrangement of a laminating and fabricating unit 310 in a three-dimensional laminating and fabricating system 300 according to this embodiment. FIG. 3A shows a laminating and fabricating unit 310A that irradiates a laminating material while performing scanning using a laser beam emitted by one irradiator.

The three-dimensional laminating and fabricating system 300 includes the laminating and fabricating unit 310A, a laminating and fabricating controller 320, and an information processing apparatus 330. The laminating and fabricating unit 310A generates a three-dimensional laminated and fabricated object in accordance with various kinds of control instructions from the laminating and fabricating controller 320. The laminating and fabricating controller 320 generates various kinds of control instructions used to control the laminating and fabricating unit 310A in accordance with three-dimensional fabricating data generated by the information processing apparatus 330. The control instructions include an irradiation instruction used to control an irradiator 312 by an irradiation amplifier 311, a scanning instruction used to control an operation direction by a scanning amplifier 313 via a rotary step motor and mirror unit 314, and a moving instruction used to control the movement of a fabricating table 318. The information processing apparatus 330 acquires the information of a laminated and fabricated object as a three-dimensional fabricating target and generates three-dimensional fabricating data. Note that the information processing apparatus 330 may be a general-purpose computer or a special computer corresponding to this embodiment.

The laminating and fabricating unit 310A includes one irradiation amplifier 311 and one irradiator 312. The laminating and fabricating unit 310A also includes one scanning amplifier 313 and a corresponding rotary step motor and mirror unit. The laminating and fabricating unit 310A also includes a moving amplifier 317 and the fabricating table 318.

FIG. 3B is a block diagram showing another functional arrangement of the laminating and fabricating unit 310 in the three-dimensional laminating and fabricating system 300 according to this embodiment. FIG. 3B shows a laminating and fabricating unit 310B that irradiates a laminating material while scanning a plurality of cell regions in parallel using laser beams emitted by a plurality of irradiators. Note that the same reference numerals as in FIG. 3A denote the same constituent elements in FIG. 3B, and a repetitive description will be omitted.

The laminating and fabricating unit 310B includes a plurality of irradiation amplifiers 321 (note that they are represented by one irradiator) and a plurality of irradiators 322. The laminating and fabricating unit 310B also includes a plurality of scanning amplifiers 313 and a plurality of corresponding rotary step motor and mirror units 314.

<<Functional Arrangement of Laminating and Fabricating Controller>>

Figure 4:
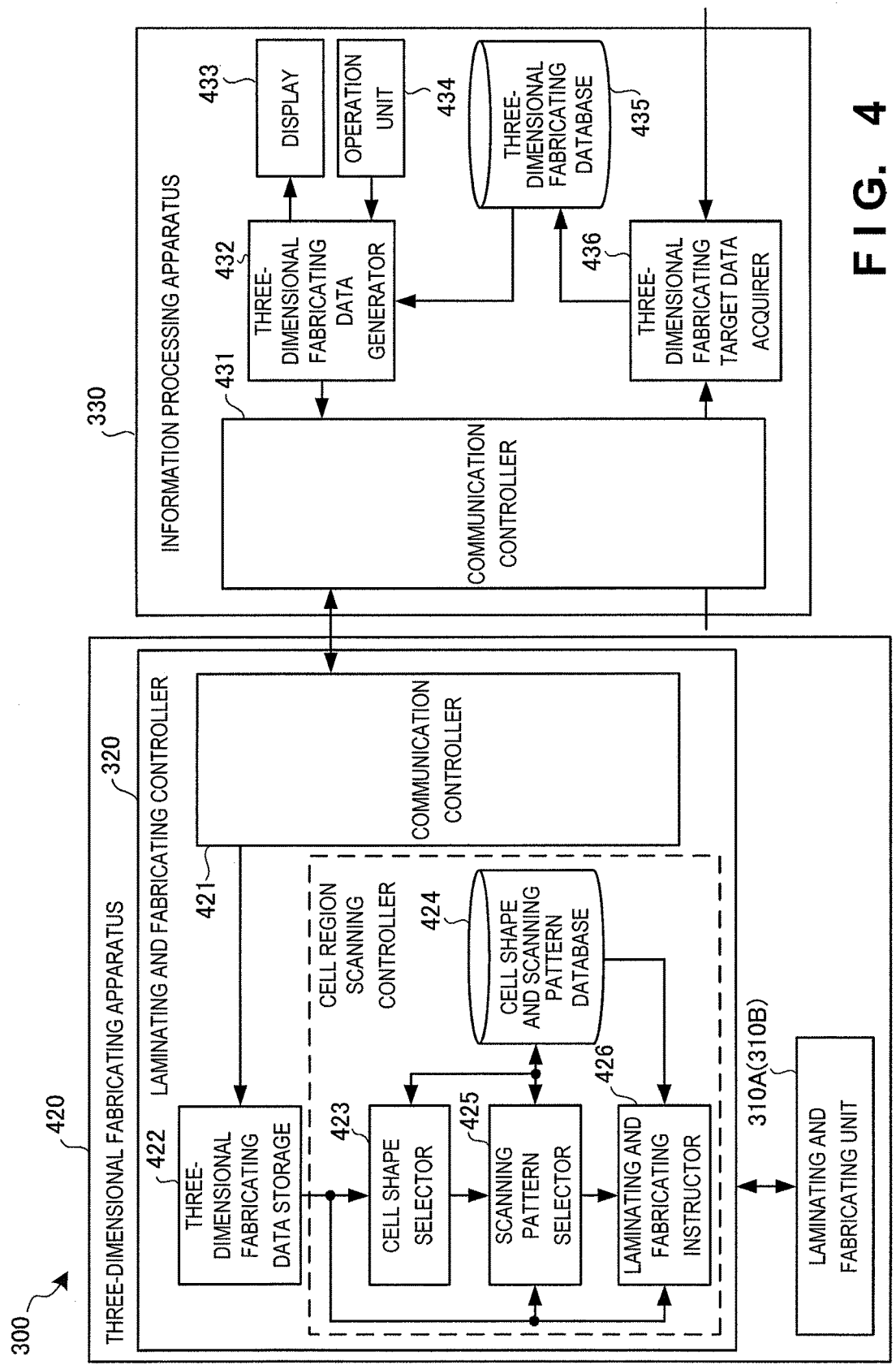
FIG. 4 is a block diagram showing the functional arrangement of a laminating and fabricating controller in the three-dimensional laminating and fabricating system according to the second embodiment of the present invention.

FIG. 4 is a block diagram showing the functional arrangement of the laminating and fabricating controller 320 in the three-dimensional laminating and fabricating system 300 according to this embodiment. FIG. 4 shows the functional arrangements of the laminating and fabricating controller 320 and the information processing apparatus 330 shown in FIGS. 3A and 3B. The laminating and fabricating unit 310A (310B) and the laminating and fabricating controller 320 may form a three-dimensional fabricating apparatus 420, that is, a so-called 3D printer. The arrangement of the laminating and fabricating unit 310A (310B) is the same as in FIG. 3A or 3B, and a repetitive description will be omitted. Note that FIG. 4 illustrates the information processing apparatus 330 and the three-dimensional fabricating apparatus 420 including the laminating and fabricating controller 320 as separate apparatuses. However, they may be formed as one apparatus, or the laminating and fabricating controller 320 may be combined with the information processing apparatus 330.

The laminating and fabricating controller 320 includes a communication controller 421, a three-dimensional fabricating data storage 422, a cell shape selector 423, a cell shape and scanning pattern database 424, a scanning pattern selector 425, and a laminating and fabricating instructor 426.

The communication controller 421 controls communication between the laminating and fabricating controller 320 and the information processing apparatus 330 and receives three-dimensional fabricating data, an instruction command, or the like from the information processing apparatus 330, or transmits the status of the laminating and fabricating controller 320 or the laminating and fabricating unit 310 to the information processing apparatus 330. The three-dimensional fabricating data storage 422 stores three-dimensional fabricating data received from the information processing apparatus 330. Note that the three-dimensional fabricating data can be stored on the basis of a three-dimensional fabricated object or a layer to be laminated, and is appropriately decided based on the laminating and fabricating speed of the three-dimensional fabricating apparatus 420, the processing speed of the information processing apparatus 330, the communication capacity between the information processing apparatus 330 and the laminating and fabricating controller 320, and the like. Note that the three-dimensional fabricating data also includes the information of laminating and fabricating conditions including the type of a fabricating material and a fabricating condition.

The cell shape selector 423 selects a cell shape and a cell size used for laminating and fabricating by referring to the cell shape and scanning pattern database 424 based on the laminating and fabricating conditions acquired from the three-dimensional fabricating data storage 422.

The cell shape and scanning pattern database 424 stores a table used to select a cell shape and a cell size, and a scanning pattern and a scanning pitch used for laminating and fabricating based on the laminating and fabricating conditions in the laminating and fabricating unit 310A (310B). The cell shape and scanning pattern database 424 also stores a table used to select a scanning speed and an irradiation intensity based on a cell shape and a cell size, and a scanning pattern and a scanning pitch.

The scanning pattern selector 425 selects a scanning pattern and a scanning pitch in a cell region used for laminating and fabricating by referring to the cell shape and scanning pattern database 424 based on the laminating and fabricating conditions acquired from the three-dimensional fabricating data storage 422. Note that the scanning pitch is the distance between scanning tracks per round when spirally scanning a cell shape. In this embodiment, the description will be made assuming that the scanning pitch is constant. However, control may be performed to make the scanning pitch wider from the periphery to the center of the cell region.

The laminating and fabricating instructor 426 generates a scanning speed and an irradiation intensity (irradiation energy) of the irradiator of the laminating and fabricating unit 310A (310B) by referring to the cell shape and scanning pattern database 424 based on the cell shape and the cell size from the cell shape selector 423 and the scanning pattern and the scanning pitch from the scanning pattern selector 425. The laminating and fabricating instructor 426 also generates a cell region position and whether to shape (whether to irradiate) the cell region based on the three-dimensional fabricating data from the three-dimensional fabricating data storage 422. The laminating and fabricating instructor 426 instructs the laminating and fabricating unit 310A (310B) to perform laminating and fabricating by the generated laminating and fabricating instruction.

The information processing apparatus 330 can be a general-purpose computer such as a PC (Personal Computer). The information processing apparatus 330 includes a communication controller 431, a three-dimensional fabricating data generator 432, a display 433, an operation unit 434, a three-dimensional fabricating database 435, and a three-dimensional fabricating target data acquirer 436. Note that if the information processing apparatus 330 includes a three-dimensional fabricating target data generation function, the three-dimensional fabricating target data acquirer 436 serves as a three-dimensional fabricating target data generator.

The communication controller 431 controls communication with the three-dimensional fabricating apparatus 420 or a three-dimensional fabricating target data generation apparatus that is an external apparatus. The three-dimensional fabricating data generator 432 generates three-dimensional fabricating data used by the three-dimensional fabricating apparatus 420 to laminate and shape a three-dimensional fabricated object using data stored in the three-dimensional fabricating database 435 in accordance with an input or operation of the operator from the operation unit 434 according to an operation instruction displayed on the display 433. The display 433 notifies the status of the three-dimensional fabricating apparatus 420 or the information processing apparatus 330, and requests the operator to input a parameter necessary for laminating and fabricating of a three-dimensional fabricated object. The operation unit 434 includes a keyboard, a pointing device, a touch panel, and the like, and accepts an input or operation instruction from the operator in accordance with an instruction displayed on the display 433. The three-dimensional fabricating database 435 stores the data, generation algorithm, generation parameter, and the like of the three-dimensional fabricated object that are data used by the three-dimensional fabricating data generator 432 to generate three-dimensional fabricating data. The three-dimensional fabricating target data acquirer 436 acquires the three-dimensional fabricating data provided by the three-dimensional fabricating target data generation apparatus via the communication controller 431 or from a storage medium or the like via an I/O interface.

(Cell Shape Selector)

FIG. 5A is a block diagram showing the functional arrangement of the cell shape selector 423 according to this embodiment.

The cell shape selector 423 includes a laminating and fabricating condition receiver 511, a use cell shape selector 512, and a cell shape output unit 513. The laminating and fabricating condition receiver 511 receives laminating and fabricating conditions including a laminating material condition and a fabricating condition from the three-dimensional fabricating data storage 422. The use cell shape selector 512 selects a cell shape to be used by referring to the cell shape and scanning pattern database 424 based on the laminating and fabricating conditions. The cell shape output unit 513 outputs the cell shape selected by the use cell shape selector 512 to the scanning pattern selector 425.

(Scanning Pattern Selector)

Figure 5B:
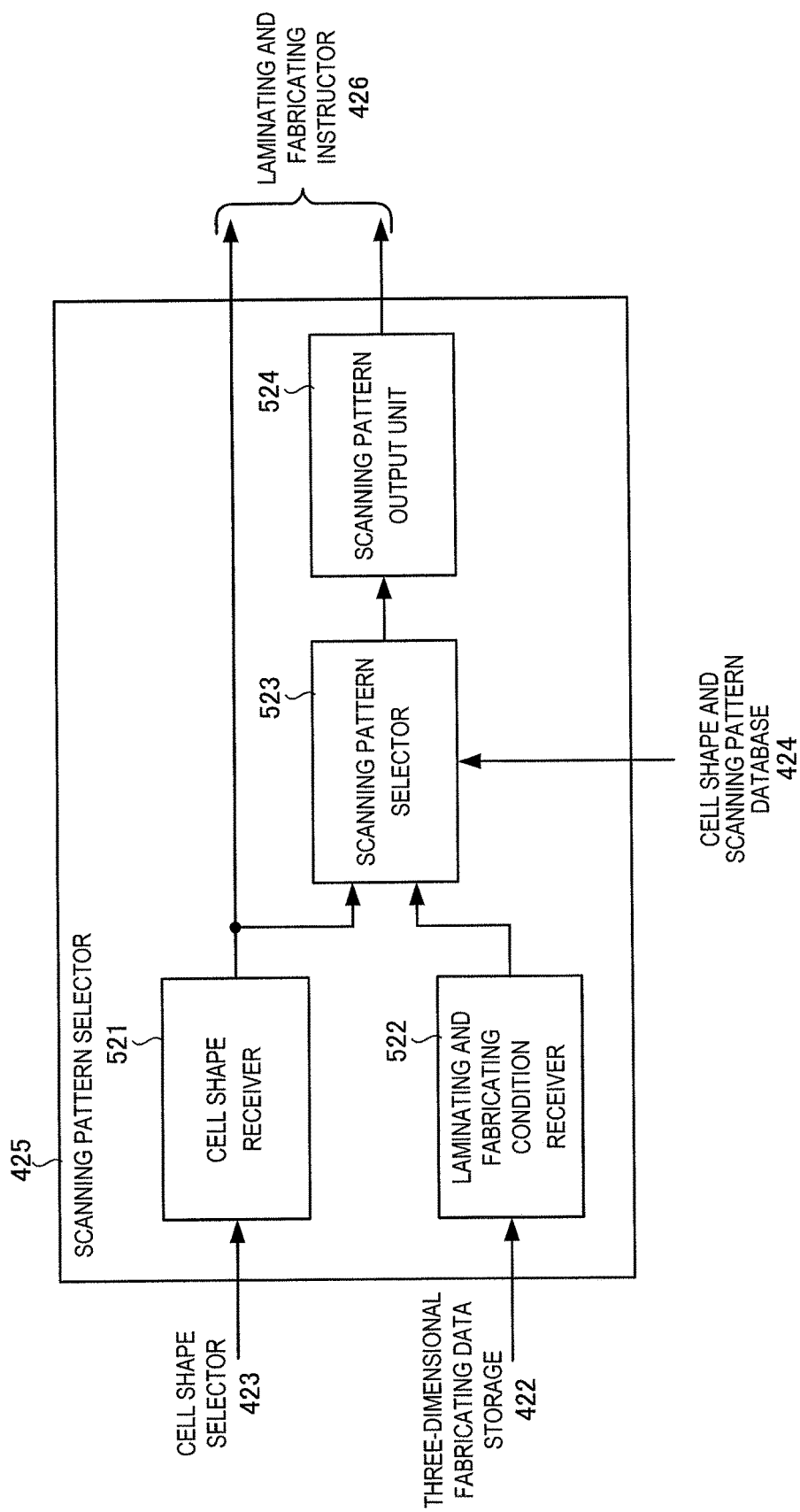
FIG. 5B is a block diagram showing the functional arrangement of a scanning pattern selector according to the second embodiment of the present invention.

FIG. 5B is a block diagram showing the functional arrangement of the scanning pattern selector 425 according to this embodiment.

The scanning pattern selector 425 includes a cell shape receiver 521, a laminating and fabricating condition receiver 522, a scanning pattern selector 523, and a scanning pattern output unit 524. The cell shape receiver 521 receives the selected cell shape from the cell shape selector 423. The laminating and fabricating condition receiver 522 receives laminating and fabricating conditions including a laminating material condition and a fabricating condition from the three-dimensional fabricating data storage 422. The scanning pattern selector 523 selects a scanning pattern to be used by referring to the cell shape and scanning pattern database 424 based on the cell shape and the laminating and fabricating conditions. The scanning pattern output unit 524 outputs the scanning pattern selected by the scanning pattern selector 523 to the laminating and fabricating instructor 426. Note that to the laminating and fabricating instructor 426, the cell shape to be used is also output from the cell shape receiver 521.

(Cell Shape and Scanning Pattern Database)

FIG. 6 is a view showing the arrangement of the cell shape and scanning pattern database 424 according to this embodiment. The cell shape and scanning pattern database 424 stores a table 610 used to select, based on laminating and fabricating conditions, a cell shape and a cell size to be used and a scanning pattern and a scanning pitch to be used. The cell shape and scanning pattern database 424 also stores a table 620 used to set, based on a cell shape and a cell size to be used and a scanning pattern and a scanning pitch to be used, a parameter used to control a scanning speed and a parameter used to control an irradiation intensity.

The table 610 stores, based on a laminating and fabricating condition 611, a cell shape 612 and a cell size 613 to be used and a scanning pattern 614 and a scanning pitch 615 to be used. Note that the laminating and fabricating condition 611 includes a material condition and a fabricating condition. The cell shape 612 includes a case in which one cell shape is used and a case in which a plurality of cell shapes are used in combination. In this embodiment, the scanning pattern 614 includes a spiral from the outer periphery to the center and a spiral from the center to the outer periphery. However, the patterns are not limited to these, any scanning pattern having an angle of 90° or more at a scanning direction change point is usable.

The table 620 stores a parameter 625 used to control a scanning speed and a parameter 626 used to control an irradiation intensity based on a cell shape 621 and a cell size 622 to be used and a scanning pattern 623 and a scanning pitch 624 to be used.

(Cell Shape and Scanning Pattern Selection Table)

Figure 7:
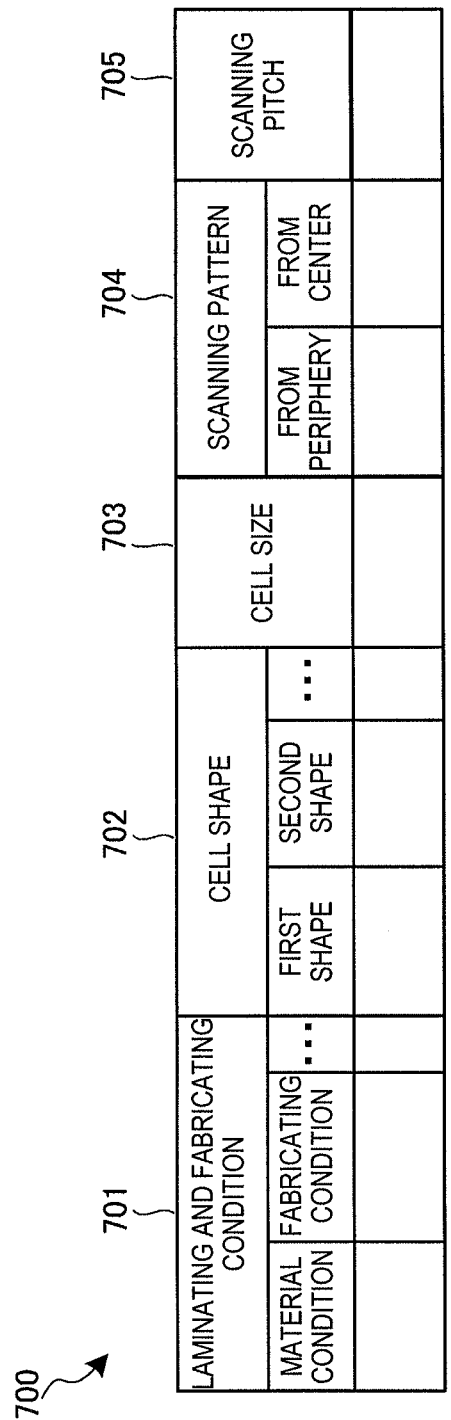
FIG. 7 is a view showing the arrangement of a cell shape and scanning pattern selection table according to the second embodiment of the present invention.

FIG. 7 is a view showing the arrangement of a cell shape and scanning pattern selection table 700 according to this embodiment. The cell shape and scanning pattern selection table is used to select a cell shape and a cell size, and a scanning pattern and a scanning pitch based on laminating and fabricating conditions by referring to the cell shape and scanning pattern database 424.

The cell shape and scanning pattern selection table 700 stores a cell shape 702 and a cell size 703 to be used, and a scanning pattern 704 and a scanning pitch 705 to be used, which are selected based on a laminating and fabricating condition 701. The contents of the items are the same as in the table 610.

(Laminating and Fabricating Instruction Table)

FIG. 8 is a view showing the arrangement of a laminating and fabricating instruction table 800 according to this embodiment. The laminating and fabricating instruction table 800 is used by the laminating and fabricating instructor 426 to generate a command to be transmitted to the laminating and fabricating unit 310. The laminating and fabricating instruction table 800 includes a set of a cell shape and a cell size selected by the cell shape selector 423 and a scanning pattern and a scanning pitch selected by the scanning pattern selector 425, and a scanning speed control parameter and an irradiation intensity control parameter corresponding to the set.

The laminating and fabricating instruction table 800 stores cell information 803 including a cell shape (cell size) and a scanning pattern (scanning pitch), a scanning speed control parameter 804, and an irradiation intensity control parameter 805 in association with an irradiator ID 801 and three-dimensional fabricating data 802 at each cell position. Note that the scanning speed control parameter 804 and the irradiation intensity control parameter 805 are parameters used to control the operation amplifier and the irradiation amplifier shown in FIG. 3A or 3B. However, the laminating and fabricating instructor 426 of the laminating and fabricating controller 320 may output the cell information and the scanning pattern information to the laminating and fabricating unit 310A (310B), and the laminating and fabricating unit 310A (310B) may include a microchip that performs scanning control in each cell region.

<<Hardware Arrangement of Laminating and Fabricating Controller>>

Figure 9:
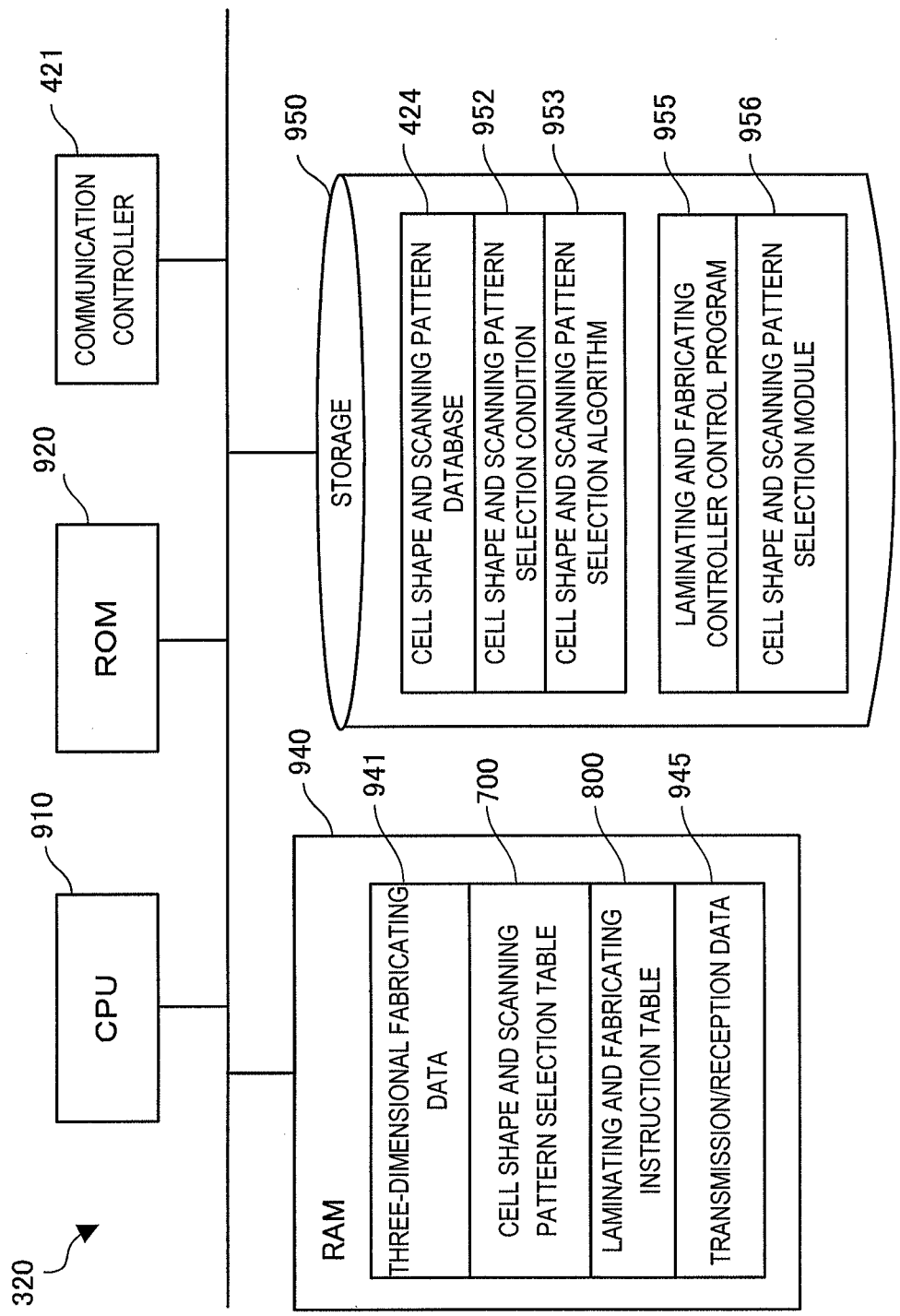
FIG. 9 is a block diagram showing the hardware arrangement of the laminating and fabricating controller according to the second embodiment of the present invention.

FIG. 9 is a block diagram showing the hardware arrangement of the laminating and fabricating controller 320 according to this embodiment.

In FIG. 9, a CPU (Central Processing Unit) 910 is a processor for arithmetic control and implements the functional components of the laminating and fabricating controller 320 shown in FIG. 4 by executing a program. A ROM (Read Only Memory) 920 stores initial data and permanent data such as a program. The communication controller 421 communicates with the information processing apparatus 330 via a network or the like. Note that the number of CPUs 910 is not limited to one, and the CPU 910 may include a plurality of CPUs or a GPU (Graphics Processing Unit) for image processing. In particular, a processor configured to select a cell region to be irradiated and a processor configured to generate various kinds of instructions to control scanning of irradiation in the cell region based on received three-dimensional fabricating data are preferably separate processors. The communication controller 421 also preferably includes a CPU independent of the CPU 910 and writes or reads transmission/reception data in or from an area of a RAM (Random Access Memory) 940.

The RAM 940 is a random access memory used by the CPU 910 as a work area for temporary storage. An area to store data necessary for implementation of the embodiment is allocated to the RAM 940. Three-dimensional fabricating data 941 is the data of a three-dimensional fabricated object that is currently laminated and fabricated. The cell shape and scanning pattern selection table 700 is a table described with reference to FIG. 7 which is used to select a cell shape and a scanning pattern. The laminating and fabricating instruction table 800 is a table described with reference to FIG. 8 which is used to generate a command to be transmitted to the laminating and fabricating unit 310. Transmission/reception data 945 is data transmitted/received via the communication controller 421.

A storage 950 stores databases, various kinds of parameters, and following data and programs necessary for implementation of the embodiment. The cell shape and scanning pattern database 424 is a database used to generate a cell shape and a scanning pattern, and a scanning speed and an irradiation intensity described with reference to FIG. 7. A cell shape and scanning pattern selection condition 952 is data representing the laminating and fabricating conditions of the laminating and fabricating unit 310 used in this embodiment. A cell shape and scanning pattern selection algorithm 953 is an algorithm that selects a cell shape and a scanning pattern based on the laminating and fabricating conditions of the laminating and fabricating unit 310.

The storage 950 stores the following programs. A laminating and fabricating controller control program 955 is a control program that controls the entire laminating and fabricating controller 320. A cell shape and scanning pattern selection module 956 is a module that selects a cell shape and a scanning pattern, and a scanning speed and an irradiation intensity.

Note that programs and data associated with general-purpose functions and other implementable functions of the laminating and fabricating controller 320 are not shown in the RAM 940 or the storage 950 of FIG. 9.

<<Processing Procedure of Laminating and Fabricating Controller>>

Figure 10A:
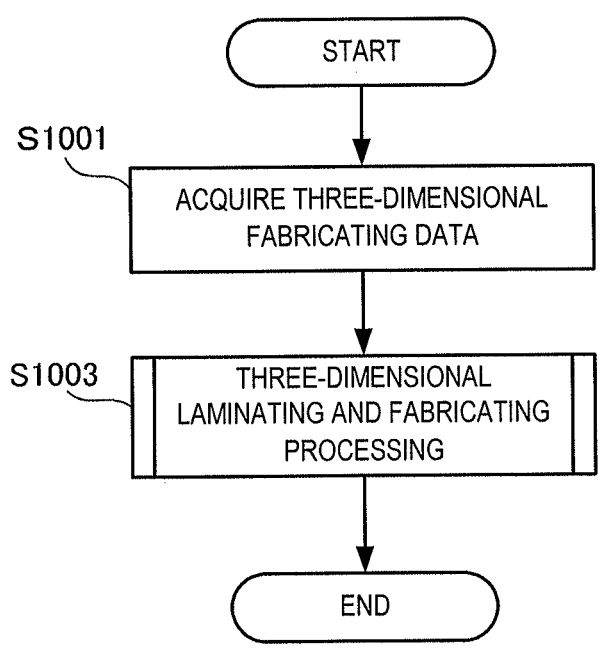
FIG. 10A is a flowchart showing the processing procedure of the laminating and fabricating controller according to the second embodiment of the present invention.

FIG. 10A is a flowchart showing the processing procedure of the laminating and fabricating controller 320 according to this embodiment. This flowchart is executed by the CPU 910 shown in FIG. 9 using the RAM 940 and implements the functional components of the laminating and fabricating controller 320 shown in FIG. 4.

In step S1001, the laminating and fabricating controller 320 receives three-dimensional fabricating data from the information processing apparatus 330 and stores it in the three-dimensional fabricating data storage 422. In step S1003, the laminating and fabricating controller 320 appropriately selects a cell shape and a scanning pattern and executes three-dimensional laminating and fabricating processing according to this embodiment.

(Three-Dimensional Laminating and Fabricating Processing)

Figure 10B:
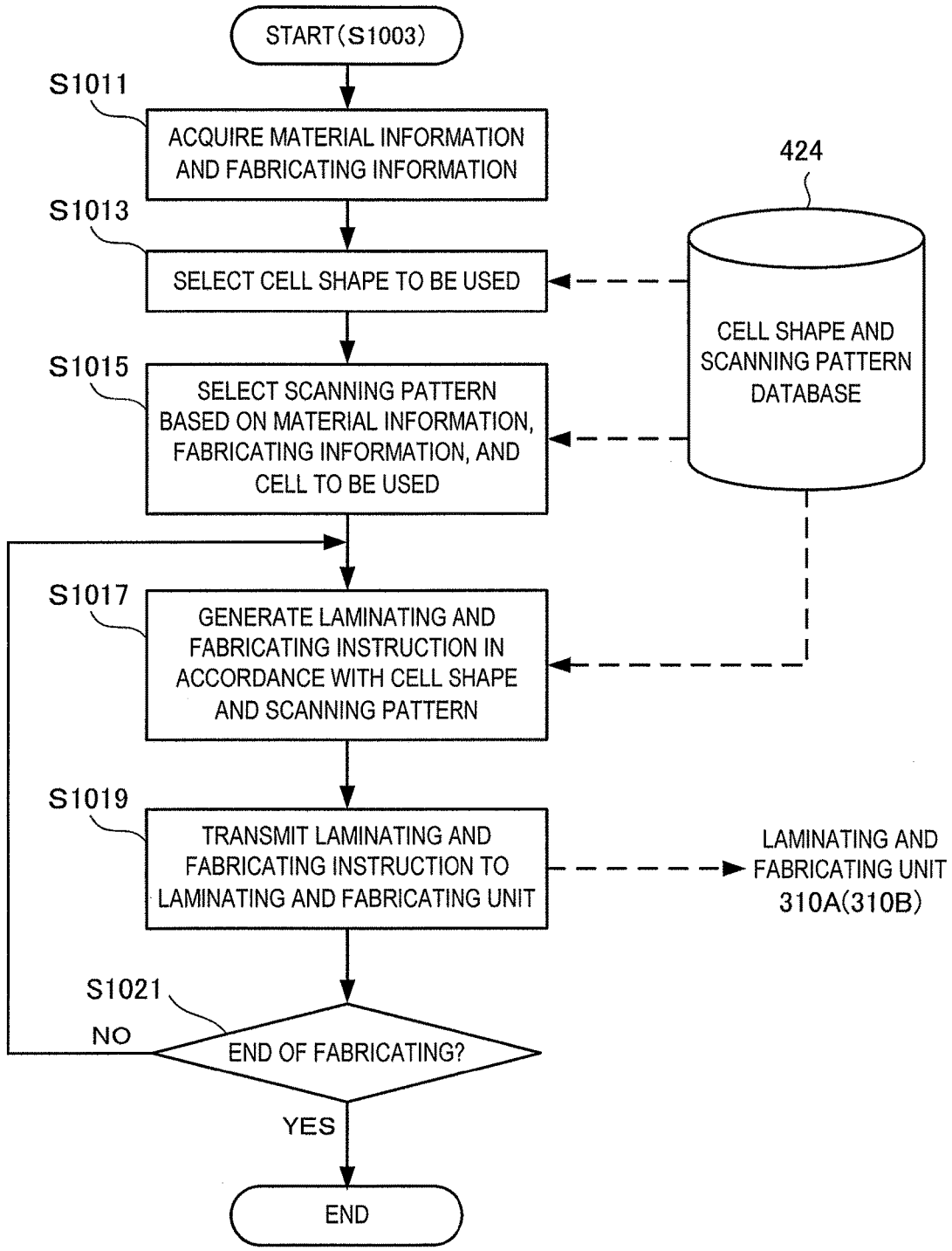
FIG. 10B is a flowchart showing the procedure of three-dimensional laminating and fabricating processing according to the second embodiment of the present invention.

FIG. 10B is a flowchart showing the procedure of three-dimensional laminating and fabricating processing (step S1003) according to this embodiment.

In step S1011, the laminating and fabricating controller 320 acquires laminating and fabricating conditions including material information and fabricating information from the three-dimensional fabricating data storage 422 together with fabricating data. In step S1013, the laminating and fabricating controller 320 selects a cell shape and a cell size to be used by referring to the table 610 in the cell shape and scanning pattern database 424 based on the laminating and fabricating conditions. In step S1015, the laminating and fabricating controller 320 selects a scanning pattern and a cell size to be used by referring to the table 610 in the cell shape and scanning pattern database 424 based on the laminating and fabricating conditions.

In step S1017, the laminating and fabricating controller 320 generates a scanning speed and an irradiation intensity based on the cell shape and the cell size to be used and the scanning pattern and the cell size to be used, and generates a laminating and fabricating instruction to the laminating and fabricating unit 310A (310B). In step S1019, the laminating and fabricating controller 320 transmits the generated laminating and fabricating instruction to the laminating and fabricating unit 310A (310B).

In step S1021, the laminating and fabricating controller 320 determines whether the fabricating of the target laminated and fabricated object ends. If the fabricating does not end, the laminating and fabricating controller 320 returns to step S1017 to repeat laminating and fabricating. If the fabricating ends, the processing ends. Note that FIG. 10B shows the procedure in which the cell shape and the scanning pattern selected first are used until the end of the fabricating. However, the cell shape, the scanning pattern, and the like may be changed in correspondence with a change in the laminating condition environment.

According to this embodiment, a pentagonal, hexagonal, octagonal, . . . , or circular cell shape, or a combination of the shapes is selected, and a spiral scanning pattern is selected, thereby shortening the scanning time of a divided cell region and shortening the fabricating time of three-dimensional laminating and fabricating.

That is, a single cell is formed into a polygonal shape with at least five vertices, and the bending angle of a scanning pattern to sinter the interior of the cell is made large, thereby reducing speed changes caused by acceleration/deceleration in the operation and uniforming supply of the energy density on the fabricating surface. It is consequently possible to stabilize the quality of the fabricating surface and suppress roughness on the fabricating surface. Additionally, geometrical bending portions in the cell are decreased to increase and uniform the fabricating speed, thereby shortening the fabricating time.

(Third Embodiment)

Laminating and fabricating by a three-dimensional laminating and fabricating system according to the third embodiment of the present invention will be described next. The three-dimensional laminating and fabricating system according to this embodiment is different from the second embodiment in that a scanning region having at least five vertices includes a cell region having an arbitrary shape, and scanning is performed while ON/OFF-controlling irradiation.

The rest of the components and operations is the same as in the second embodiment. Hence, the same reference numerals denote the same components and operations, and a detailed description thereof will be omitted.

<<Concept of Fabricating of Three-Dimensional Laminating and Fabricating System>>

Figure 11A:
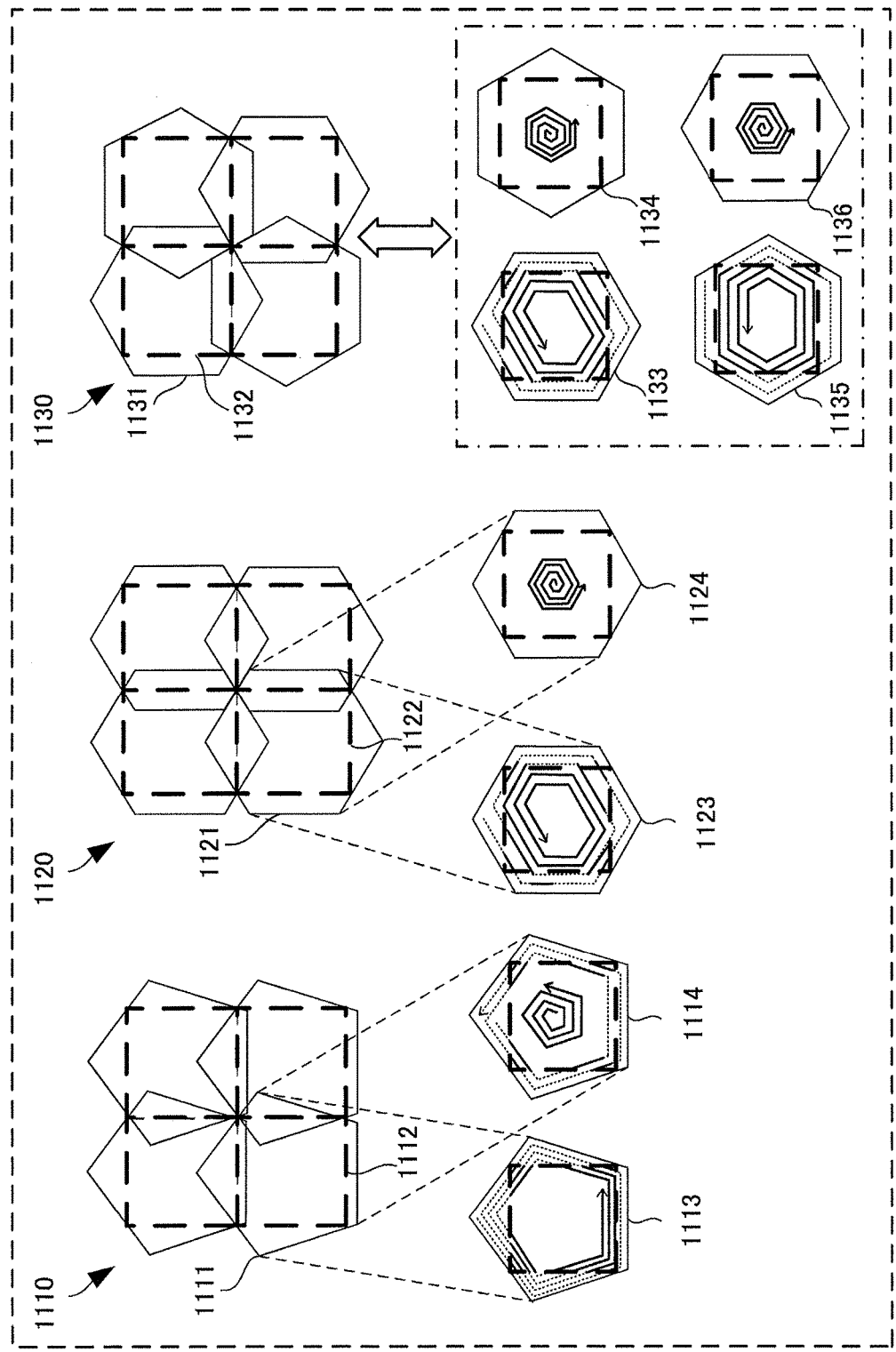
FIG. 11A is a conceptual view showing a fabricating state by a three-dimensional laminating and fabricating system according to the third embodiment of the present invention.
Figure 11B:
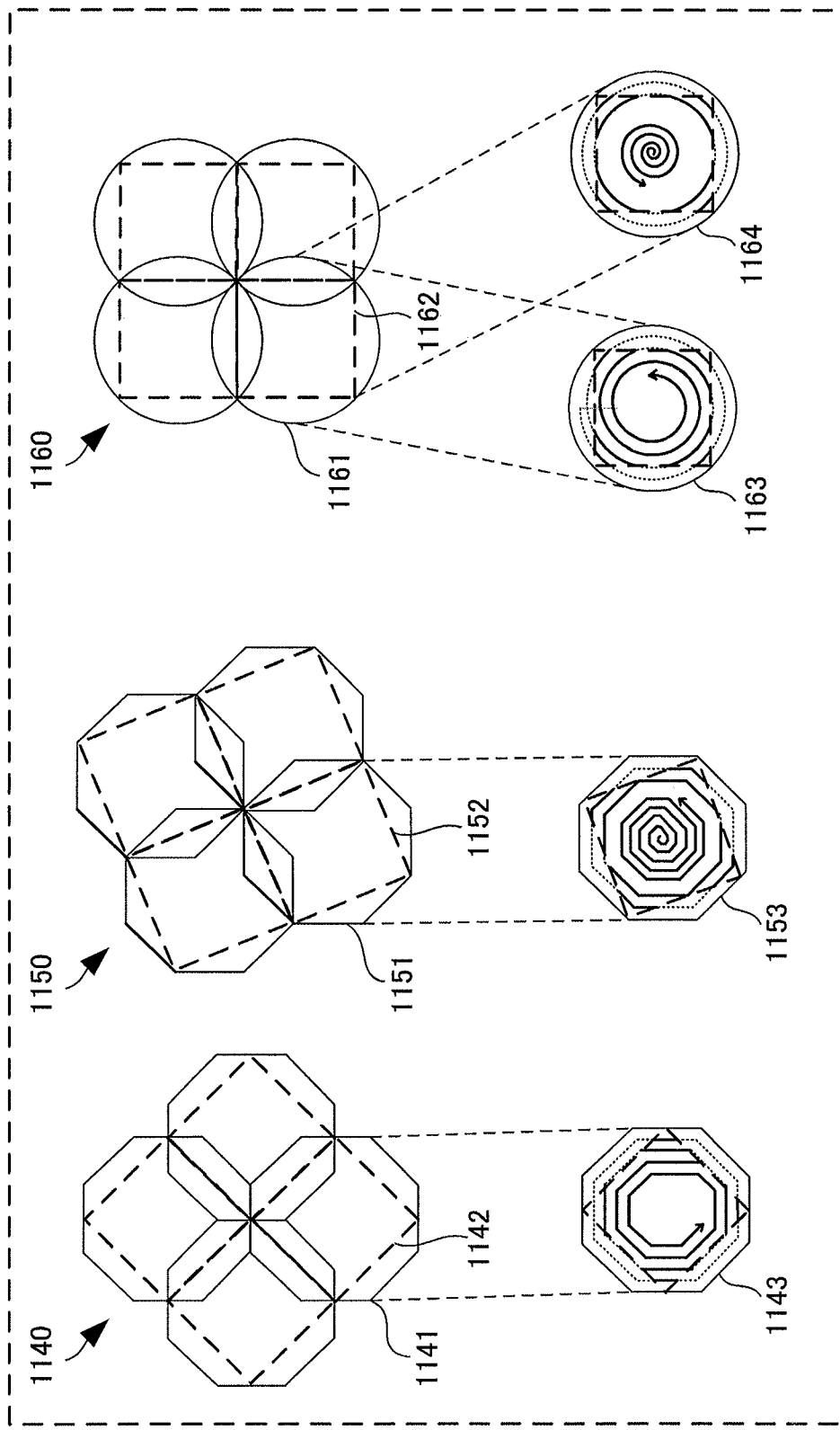
FIG. 11B is a conceptual view showing a fabricating state by the three-dimensional laminating and fabricating system according to the third embodiment of the present invention.

FIGS. 11A and 11B are conceptual views each showing a fabricating state by the three-dimensional laminating and fabricating system according to this embodiment. Note that in FIGS. 11A and 11B, a part of a fabricating portion 200 on one laminated surface will be described.

The left view of FIG. 11A shows a case in which an aggregate of scanning regions having the same pentagonal shape and arranged in the same direction is set, and laminating and fabricating are performed by ON/OFF-controlled irradiation from an irradiator. A pentagonal scanning region 1111 includes a rectangular cell region 1112. A scanning region 1113 shows a pattern used to perform irradiation while performing spiral scanning from the periphery to the center of the pentagon in which the irradiation is turned off for a broken line portion and on for a solid line portion. A scanning region 1114 shows a pattern used to perform irradiation while performing spiral scanning from the center to the periphery of the pentagon in which the irradiation is turned off for a broken line portion and on for a solid line portion. Note that in the fabricating, the irradiation may be done using the same pattern of the scanning region 1113 or 1114. Alternatively, the irradiation may be done using a combination of the scanning regions 1113 and 1114 in consideration of the molten state of the material.

The central view of FIG. 11A shows a case in which an aggregate of scanning regions having the same hexagonal shape and arranged in the same direction is set, and laminating and fabricating are performed by ON/OFF-controlled irradiation from the irradiator. A hexagonal scanning region 1121 includes a rectangular cell region 1122. A scanning region 1123 shows a pattern used to perform irradiation while performing spiral scanning from the periphery to the center of the hexagon in which the irradiation is turned off for a broken line portion and on for a solid line portion. A scanning region 1124 shows a pattern used to perform irradiation while performing spiral scanning from the center to the periphery of the hexagon in which the irradiation is turned off for a broken line portion and on for a solid line portion. Note that in the fabricating, the irradiation may be done using the same pattern of the scanning region 1123 or 1124. Alternatively, the irradiation may be done using a combination of the scanning regions 1123 and 1124 in consideration of the molten state of the material.

The right view of FIG. 11A shows a case in which an aggregate of scanning regions having the same hexagonal shape and arranged in different directions is set, and laminating and fabricating are performed by ON/OFF-controlled irradiation from the irradiator. A hexagonal scanning region 1131 includes a rectangular cell region 1132. Although the directions are different, scanning regions 1133 and 1135 show a pattern used to perform irradiation while performing spiral scanning from the periphery to the center of the hexagon in which the irradiation is turned off for a broken line portion and on for a solid line portion. Although the directions are different, scanning regions 1134 and 1136 show a pattern used to perform irradiation while performing spiral scanning from the center to the periphery of the hexagon in which the irradiation is turned off for a broken line portion and on for a solid line portion. Note that in the fabricating, the irradiation may be done using the same pattern of the scanning regions 1133 and 1135 or 1134 and 1136. Alternatively, the irradiation may be done using a combination of the scanning regions 1133 to 1136 in consideration of the molten state of the material.

The left view of FIG. 11B shows a case in which an aggregate of scanning regions having the same octagonal shape and arranged in the same direction is set, and laminating and fabricating are performed by ON/OFF-controlled irradiation from the irradiator. An octagonal scanning region 1141 includes a rectangular cell region 1142 that has vertices lying on the sides of the octagonal scanning region 1141 so as to be inscribed. A scanning region 1143 shows a pattern used to perform irradiation while performing spiral scanning from the periphery to the center of the octagon in which the irradiation is turned off for a broken line portion and on for a solid line portion. Although not illustrated, a pattern may be used to perform irradiation while ON/OFF-controlling the irradiation and performing spiral scanning from the center to the periphery of the octagon. Note that in the fabricating, the scanning regions may be irradiated using the same pattern. Alternatively, the scanning regions may be irradiated using a combination of different patterns in consideration of the molten state of the material.

The central view of FIG. 11B shows a case in which an aggregate of scanning regions having the same octagonal shape and arranged in the same direction is set, and laminating and fabricating are performed by ON/OFF-controlled irradiation from the irradiator. An octagonal scanning region 1141 includes a rectangular cell region 1152 that has vertices lying on the corners of the octagonal scanning region 1151 so as to be inscribed. A scanning region 1153 shows a pattern used to perform irradiation while performing spiral scanning from the center to the periphery of the octagon in which the irradiation is turned off for a broken line portion and on for a solid line portion. Although not illustrated, a pattern may be used to perform irradiation while ON/OFF-controlling the irradiation and performing spiral scanning from the periphery to the center of the octagon. Note that in the fabricating, the scanning regions may be irradiated using the same pattern. Alternatively, the scanning regions may be irradiated using a combination of different patterns in consideration of the molten state of the material.

The right view of FIG. 11B shows a case in which an aggregate of scanning regions having the same circular shape is set, and laminating and fabricating are performed by ON/OFF-controlled irradiation from the irradiator. A circular scanning region 1161 includes a rectangular cell region 1162 inscribed in the circular scanning region 1161. A scanning region 1163 shows a pattern used to perform irradiation while performing spiral scanning from the periphery to the center of the circle in which the irradiation is turned off for a broken line portion and on for a solid line portion. A scanning region 1164 shows a pattern used to perform irradiation while performing spiral scanning from the center to the periphery of the circle in which the irradiation is turned off for a broken line portion and on for a solid line portion. Note that in the fabricating, the scanning regions may be irradiated using the same pattern. Alternatively, the scanning regions may be irradiated using a combination of different patterns in consideration of the molten state of the material.

Note that cases in which the cell regions have pentagonal, hexagonal, octagonal, and circular shapes have been described with reference to FIGS. 11A and 11B. However, the shapes are not limited to these. According to this embodiment, a shape including at least five vertices each with an interior angle of 90° or more can be used.

<<Functional Arrangement of Laminating and Fabricating Controller>>

Figure 12:
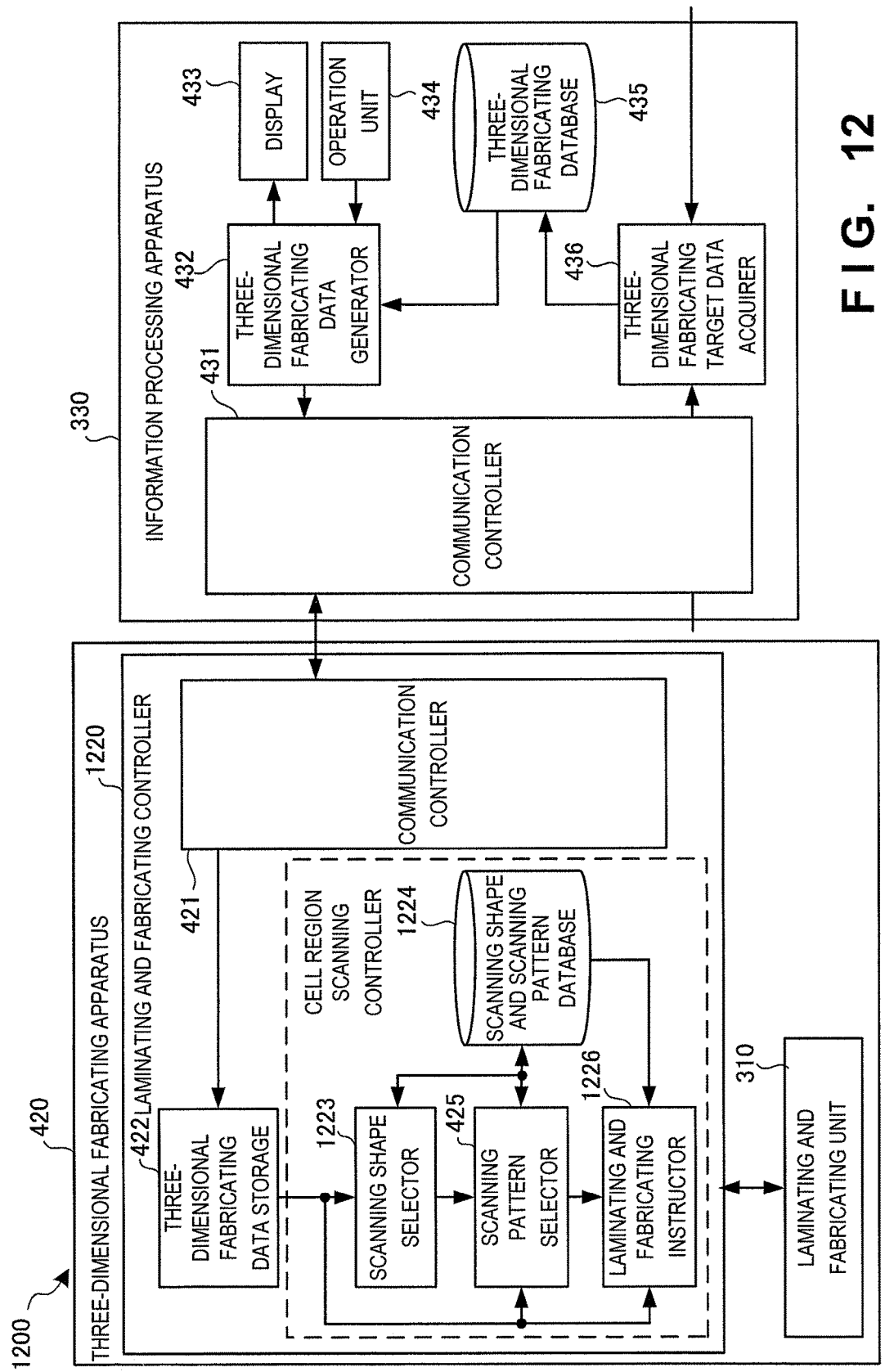
FIG. 12 is a block diagram showing the functional arrangement of a laminating and fabricating controller in the three-dimensional laminating and fabricating system according to the third embodiment of the present invention.

FIG. 12 is a block diagram showing the functional arrangement of a laminating and fabricating controller 1220 in a three-dimensional laminating and fabricating system 1200 according to this embodiment. Note that the same reference numerals as in FIG. 4 denote the same functional components in FIG. 12, and a repetitive description will be omitted. A laminating and fabricating unit 310A (310B) and the laminating and fabricating controller 1220 may form a three-dimensional fabricating apparatus 420, that is, a so-called 3D printer. The arrangement of the laminating and fabricating unit 310A (310B) is the same as in FIG. 3A or 3B, and a repetitive description will be omitted. Note that FIG. 12 illustrates an information processing apparatus 330 and the three-dimensional fabricating apparatus 420 including the laminating and fabricating controller 1220 as separate apparatuses. However, they may be formed as one apparatus, or the laminating and fabricating controller 1220 may be combined with the information processing apparatus 330.

The laminating and fabricating controller 1220 includes a communication controller 421, a three-dimensional fabricating data storage 422, a scanning shape selector 1223, a scanning shape and scanning pattern database 1224, a scanning pattern selector 425, and a laminating and fabricating instructor 1226.

The scanning shape selector 1223 selects a scanning shape and a scanning region size including a cell shape to be used for laminating and fabricating by referring to the scanning shape and scanning pattern database 1224 based on laminating and fabricating conditions acquired from the three-dimensional fabricating data storage 422.

The scanning shape and scanning pattern database 1224 stores a table used to select a scanning shape and a scanning region size, and a scanning pattern and a scanning pitch to be used for laminating and fabricating based on laminating and fabricating conditions in the laminating and fabricating unit 310A (310B). The scanning shape and scanning pattern database 1224 also stores a table used to set a scanning speed, an irradiation intensity, and an irradiation ON/OFF signal based on a scanning shape and a scanning region size, and a scanning pattern and a scanning pitch.

The laminating and fabricating instructor 1226 generates a scanning speed, an irradiation intensity (irradiation energy), and an irradiation ON/OFF signal by the irradiator of the laminating and fabricating unit 310A (310B) by referring to the scanning shape and scanning pattern database 1224 based on the scanning shape and the scanning region size from the scanning shape selector 1223 and the scanning pattern and the scanning pitch from the scanning pattern selector 425. The laminating and fabricating instructor 1226 also generates a cell region position and whether to fabricate (whether to irradiate) the cell region based on three-dimensional fabricating data from the three-dimensional fabricating data storage 422. The laminating and fabricating instructor 1226 instructs the laminating and fabricating unit 310A (310B) to perform laminating and fabricating by the generated laminating and fabricating instruction.

(Scanning Shape and Scanning Pattern Database)

FIG. 13 is a view showing the arrangement of the scanning shape and scanning pattern database 1224 according to this embodiment. The scanning shape and scanning pattern database 1224 stores a table 1310 used to select a scanning shape and a scanning region size to be used and a scanning pattern and a scanning pitch to be used based on laminating and fabricating conditions. The scanning shape and scanning pattern database 1224 also stores a table 1320 used to set, based on a scanning shape and a scanning region size to be used and a scanning pattern and a scanning pitch to be used, a parameter used to control a scanning speed, a parameter used to control an irradiation intensity, and a parameter used to control irradiation ON/OFF. Note that the same reference numerals as in FIG. 6 denote the same constituent elements in FIG. 13, and a repetitive description will be omitted.

The table 1310 stores a scanning shape 1312 including a cell shape, a scanning region size 1313, a scanning pattern 614 to be used, and a scanning pitch 615 based on a laminating and fabricating condition 611. The table 1320 stores a parameter 625 used to control a scanning speed, a parameter 626 used to control an irradiation intensity, and a parameter 1327 used to control irradiation ON/OFF based on a scanning shape 1321 and a scanning region size 1322 to be used, the scanning pattern 623 and the scanning pitch 624 to be used, and a cell shape 621 and a cell size 622 to be used.

(Laminating and Fabricating Instruction Table)

Figure 14:
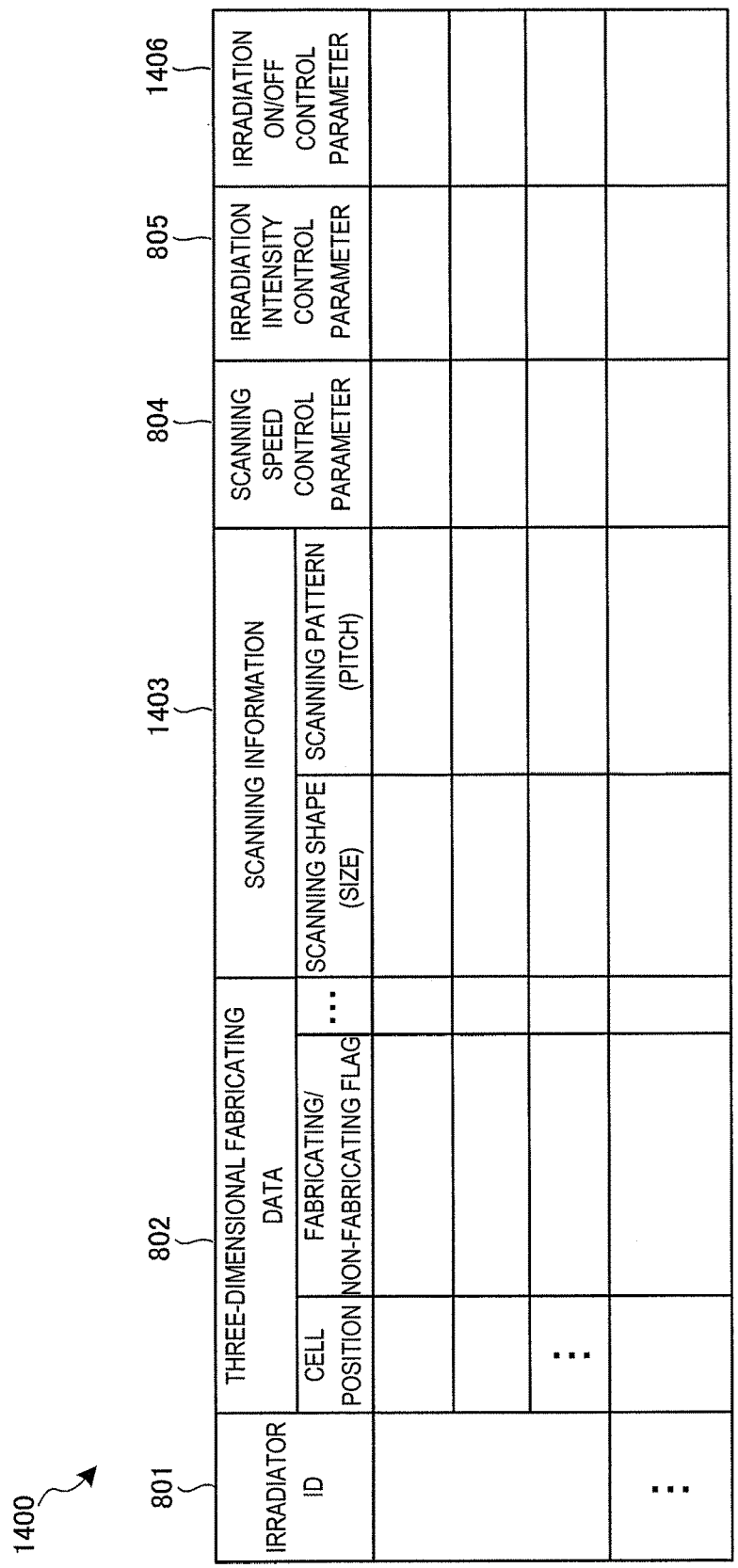
FIG. 14 is a view showing the arrangement of a laminating and fabricating instruction table according to the third embodiment of the present invention.

FIG. 14 is a view showing the arrangement of a laminating and fabricating instruction table 1400 according to this embodiment. The laminating and fabricating instruction table 1400 is used by the laminating and fabricating instructor 1226 to generate a command to be transmitted to the laminating and fabricating unit 310. The laminating and fabricating instruction table 1400 stores a set of a scanning shape and a scanning region size selected by the scanning shape selector 1223, and a scanning pattern and a scanning pitch selected by the scanning pattern selector 425, and a scanning speed control parameter, an irradiation intensity control parameter, and an irradiation ON/OFF control parameter corresponding to the set. Note that the same reference numerals as in FIG. 8 denote the same constituent elements in FIG. 14, and a repetitive description will be omitted.

The laminating and fabricating instruction table 1400 stores scanning information 1403 including a scanning shape (scanning region size) and a scanning pattern (scanning pitch), a scanning speed control parameter 804, an irradiation intensity control parameter 805, and an irradiation ON/OFF control parameter 1406 in association with an irradiator ID 801 and three-dimensional fabricating data 802 at each cell position.

(Three-Dimensional Laminating and Fabricating Processing)

Figure 15:
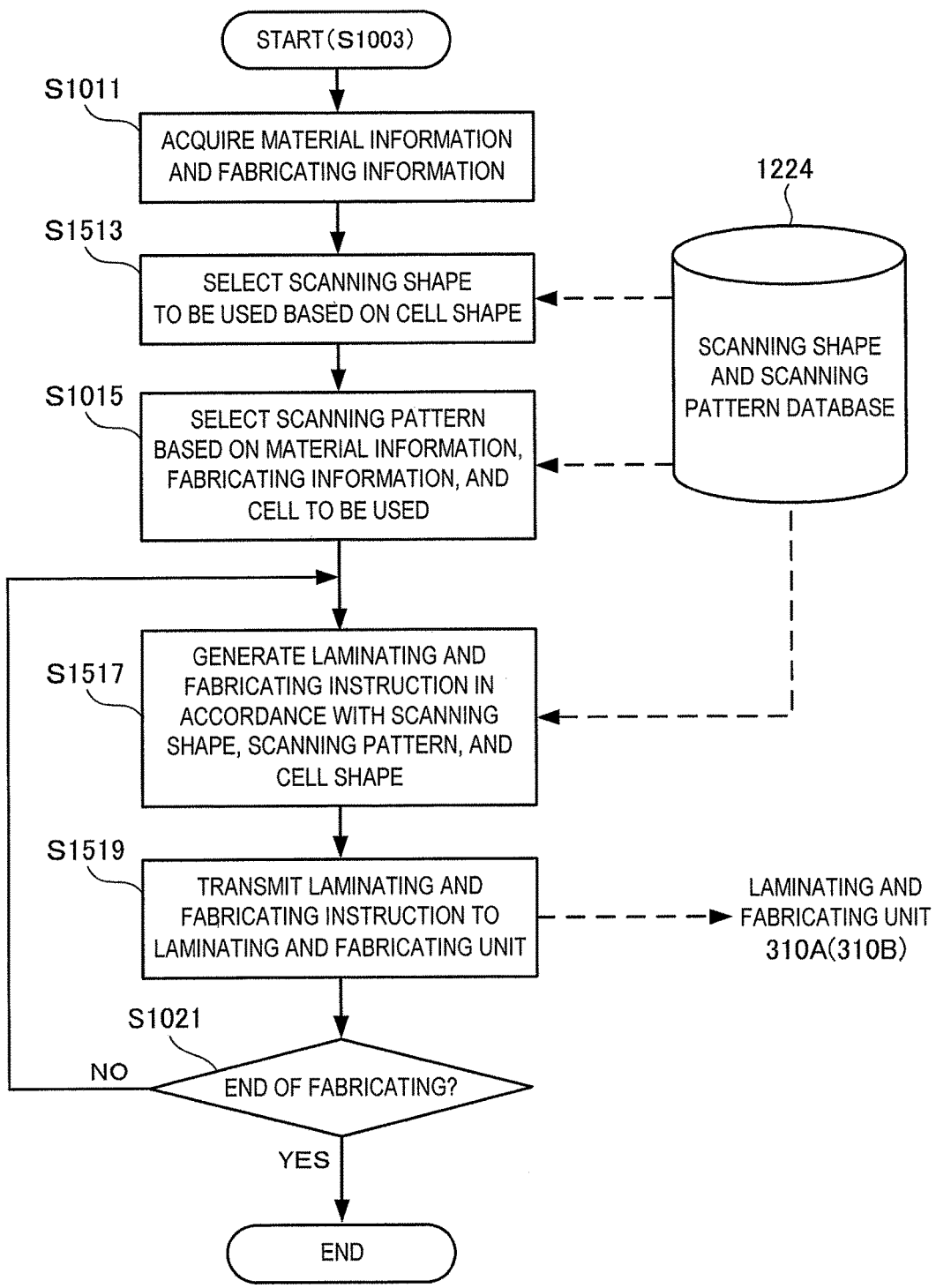
FIG. 15 is a flowchart showing the procedure of three-dimensional laminating and fabricating processing according to the third embodiment of the present invention.

FIG. 15 is a flowchart showing the procedure of three-dimensional laminating and fabricating processing (step 51003) according to this embodiment. Note that the same step numbers as in FIG. 10B denote the same steps in FIG. 15, and a repetitive description will be omitted.

In step S1513, the laminating and fabricating controller 1220 selects a scanning shape and a scanning region size including a cell shape to be used by referring to the table 1310 in the scanning shape and scanning pattern database 1224 based on laminating and fabricating conditions. In step S1517, the laminating and fabricating controller 1220 generates a scanning speed, an irradiation intensity, and an irradiation ON/OFF signal based on the scanning shape and the scanning region size to be used and the scanning pattern and the cell size to be used, and generates a laminating and fabricating instruction to the laminating and fabricating unit 310A (310B). In step 51519, the laminating and fabricating controller 1220 transmits the generated laminating and fabricating instruction to the laminating and fabricating unit 310A (310B).

According to this embodiment, a pentagonal, hexagonal, octagonal, . . . , or circular scanning shape or a combination of the shapes, which includes a cell shape, is selected, and a spiral scanning pattern is selected, thereby shortening the scanning time of a divided scanning region and shortening the fabricating time of three-dimensional laminating and fabricating. In addition, according to this embodiment, since a pentagonal, hexagonal, octagonal, . . . , or circular scanning shape or a combination of the shapes includes a cell shape, it is possible to shorten the scanning time and shorten the fabricating time of three-dimensional laminating and fabricating even if an arbitrary cell shape is used.

(Other Embodiments)

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

The invention claimed is:

1. A three-dimensional laminating and fabricating system comprising:
a laminating and fabricating unit that includes at least one irradiator configured to irradiate a laminating material and fabricates, as an aggregate of cell regions, each layer of a laminated and fabricated object made of the laminating material; and
a laminating and fabricating controller that controls said laminating and fabricating unit such that said irradiator irradiates the laminating material in each of the cell regions by performing spiral scanning along sides of and within a scanning region that is used to irradiate the cell regions by said irradiator and has a shape including at least five vertices with an interior angle of not less than 90°,
wherein a shape of the scanning region includes a shape of each of the cell regions, and said laminating and fabricating controller controls said laminating and fabricating unit to allow irradiation of the irradiator when a position of the spiral scanning is located within each of the cell regions and prohibit irradiation of the irradiator when the position of the spiral scanning is located outside each of the cell regions, while performing the spiral scanning within the scanning region.

2. A method of three-dimensional laminating and fabricating, comprising:
fabricating, as an aggregate of cell regions, each layer of a laminated and fabricated object made of a laminating material, using a laminating and fabricating unit including at least one irradiator configured to irradiate the laminating material; and
controlling the laminating and fabricating unit such that the irradiator irradiates the laminating material in each of the cell regions by performing spiral scanning along sides of and within a scanning region that is used to irradiate the cell regions by the irradiator and has a shape including at least five vertices with an interior angle of not less than 90°,
wherein a shape of the scanning region includes a shape of each of the cell regions, and said laminating and fabricating unit is controlled to allow irradiation of the irradiator when a position of the spiral scanning is located within each of the cell regions and prohibit irradiation of the irradiator when the position of the spiral scanning is located outside each of the cell regions, while performing the spiral scanning within the scanning region.

3. A laminating and fabricating control apparatus comprising:
a data acquirer that acquires data of a laminated and fabricated object as a target of laminating and fabricating; and
a scanning controller that controls a laminating and fabricating unit including at least one irradiator configured to irradiate a laminating material and fabricating each layer of the laminated and fabricated object as an aggregate of cell regions, said scanning controller controlling the laminating and fabricating unit based on the data of the laminated and fabricated object such that said irradiator irradiates the laminating material in each of the cell regions by performing spiral scanning along sides of and within a scanning region that is used to irradiate the cell regions by the irradiator and has a shape including at least five vertices with an interior angle of not less than 90°,
wherein a shape of the scanning region includes a shape of each of the cell regions, and said scanning controller controls said laminating and fabricating unit to allow irradiation of the irradiator when a position of the spiral scanning is located within each of the cell regions and prohibit irradiation of the irradiator when the position of the spiral scanning is located outside each of the cell regions, while performing the spiral scanning within the scanning region.

4. The apparatus according to claim 3, wherein a shape of the scanning region matches a shape of each of the cell regions.

5. The apparatus according to claim 3, wherein a shape of the scanning region includes a circle.

6. The apparatus according to claim 3, wherein a shape of the scanning region is selected from a combination of shapes including different numbers of vertices.

7. The apparatus according to claim 3, wherein said laminating and fabricating unit includes a plurality of irradiators to fabricate a plurality of cell regions in parallel, and said scanning controller controls said plurality of irradiators.

8. The apparatus according to claim 3, wherein said scanning controller selects shapes of the scanning region and cell region and a start point of the spiral scanning, based on laminating and fabricating conditions including a condition of material used for laminating and fabricating and a condition of fabricating.

9. The apparatus according to claim 3, wherein said scanning controller controls irradiation energy of said irradiator in accordance with a scanning speed and a scanning position.

10. A method of controlling a laminating and fabricating control apparatus, comprising:
acquiring data of a laminated and fabricated object as a target of laminating and fabricating; and controlling a laminating and fabricating unit that includes at least one irradiator configured to irradiate a laminating material and fabricates each layer of the laminated and fabricated object as an aggregate of cell regions, based on the data of the laminated and fabricated object, such that the irradiator irradiates the laminating material in each of the cell regions by performing spiral scanning along sides of and within a scanning region that is used to irradiate the cell regions by the irradiator and has a shape including at least five vertices with an interior angle of not less than 90°, wherein a shape of the scanning region includes a shape of each of the cell regions, and said laminating and fabricating unit is controlled to allow irradiation of the irradiator when a position of the spiral scanning is located within each of the cell regions and prohibit irradiation of the irradiator when the position of the spiral scanning is located outside each of the cell regions, while performing the spiral scanning within the scanning region.

11. A non-transitory computer-readable storage medium storing a control program of a laminating and fabricating control apparatus, which causes a computer to execute a method, comprising:

acquiring data of a laminated and fabricated object as a target of laminating and fabricating; and controlling a laminating and fabricating unit that includes at least one irradiator configured to irradiate a laminating material and fabricates each layer of the laminated and fabricated object as an aggregate of cell regions, based on the data of the laminated and fabricated object, such that the irradiator irradiates the laminating material in each of the cell regions by performing spiral scanning along sides of and within a scanning region that is used to irradiate the cell regions by the irradiator and has a shape including at least five vertices with an interior angle of not less than 90°, wherein a shape of the scanning region includes a shape of each of the cell regions, and said laminating and fabricating unit is controlled to allow irradiation of the irradiator when a position of the spiral scanning is located within each of the cell regions and prohibit irradiation of the irradiator when the position of the spiral scanning is located outside each of the cell regions, while performing the spiral scanning within the scanning region.

* * * * *